(12) United States Patent
Sasaki et al.

(10) Patent No.: US 7,737,353 B2
(45) Date of Patent: Jun. 15, 2010

(54) APPARATUS FOR CONTROLLING MUSIC REPRODUCTION AND APPARATUS FOR REPRODUCING MUSIC

(75) Inventors: Michihiko Sasaki, Hamamatsu (JP); Shinichi Ito, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 637 days.

(21) Appl. No.: 11/655,660

(22) Filed: Jan. 19, 2007

(65) Prior Publication Data

US 2007/0169614 A1   Jul. 26, 2007

(30) Foreign Application Priority Data

Jan. 20, 2006   (JP)   ............................ 2006-012550
Jan. 20, 2006   (JP)   ............................ 2006-012551

(51) Int. Cl.
     *G10H 7/00*   (2006.01)
(52) U.S. Cl. ...................................... 84/612
(58) Field of Classification Search .................. 84/612; 700/94

See application file for complete search history.

(56) References Cited

U.S. PATENT DOCUMENTS

| | | | | |
|---|---|---|---|---|
| 4,337,529 | A * | 6/1982 | Morokawa | 377/20 |
| 4,788,983 | A * | 12/1988 | Brink et al. | 600/547 |
| 5,215,468 | A * | 6/1993 | Lauffer et al. | 434/236 |
| 5,267,942 | A * | 12/1993 | Saperston | 600/28 |
| 5,592,143 | A * | 1/1997 | Romney et al. | 340/309.16 |
| 6,013,007 | A * | 1/2000 | Root et al. | 482/8 |
| 6,230,047 | B1 * | 5/2001 | McHugh | 600/519 |
| 6,246,362 | B1 * | 6/2001 | Tsubata et al. | 342/357.08 |
| 6,572,511 | B1 * | 6/2003 | Volpe | 482/4 |
| 6,607,493 | B2 * | 8/2003 | Song | 600/502 |
| 6,623,427 | B2 * | 9/2003 | Mandigo | 600/300 |
| 6,808,473 | B2 * | 10/2004 | Hisano et al. | 482/8 |
| 7,003,122 | B2 * | 2/2006 | Chen | 381/67 |
| 7,177,672 | B2 * | 2/2007 | Nissila | 600/519 |
| 7,207,935 | B1 * | 4/2007 | Lipo | 600/28 |
| 2001/0003542 | A1 * | 6/2001 | Kita | 381/334 |
| 2002/0091049 | A1 * | 7/2002 | Hisano et al. | 482/148 |
| 2002/0091796 | A1 * | 7/2002 | Higginson et al. | 709/218 |
| 2005/0049113 | A1 * | 3/2005 | Yueh et al. | 482/8 |

(Continued)

FOREIGN PATENT DOCUMENTS

| | | |
|---|---|---|
| EP | 1251441 | 3/2001 |
| EP | 1533784 | 11/2004 |

(Continued)

*Primary Examiner*—Jeffrey Donels
(74) *Attorney, Agent, or Firm*—Morrison & Foerster LLP

(57) ABSTRACT

In order to reproduce music suitable for a situation where a user listens to the music while performing repetitive exercise, if a walking tempo value sensed by a walking tempo sensing portion 3 falls outside a certain range defined on the basis of a music tempo value of a music data file currently being reproduced by a music data reproduction portion 6, a music tempo specifying portion 4 specifies a music tempo value agreeing with the walking tempo value. A reproduction control portion 5 selects a music data file having a music tempo value corresponding to the music tempo specified by the music tempo specifying portion 4 from among a plurality of music data files stored along with data on music tempo of the respective music data files in a data storage portion 2, and causes the music data reproduction portion 6 to start the reproduction of the selected music data file.

16 Claims, 15 Drawing Sheets

U.S. PATENT DOCUMENTS

| | | |
|---|---|---|
| 2005/0124463 A1 | 6/2005 | Yeo et al. |
| 2005/0126370 A1* | 6/2005 | Takai et al. .................... 84/636 |
| 2005/0129253 A1* | 6/2005 | Chen .......................... 381/67 |
| 2005/0141729 A1* | 6/2005 | Kanzaki et al. ............... 381/67 |
| 2005/0249080 A1 | 11/2005 | Foote et al. |
| 2006/0084551 A1* | 4/2006 | Volpe, Jr. ....................... 482/8 |
| 2006/0102171 A1* | 5/2006 | Gavish ...................... 128/95.1 |
| 2006/0107822 A1* | 5/2006 | Bowen ........................ 84/612 |
| 2006/0111621 A1* | 5/2006 | Coppi et al. ................. 600/300 |
| 2006/0169125 A1* | 8/2006 | Ashkenazi et al. ............ 84/612 |
| 2006/0288846 A1* | 12/2006 | Logan ......................... 84/612 |
| 2007/0044641 A1* | 3/2007 | McKinney et al. ........... 84/612 |
| 2007/0079691 A1* | 4/2007 | Turner ........................ 84/612 |

FOREIGN PATENT DOCUMENTS

| | | |
|---|---|---|
| EP | 1128358 | 8/2001 |
| EP | 1585134 | 4/2005 |
| EP | 1705588 | 9/2006 |
| EP | 1729290 | 12/2006 |
| JP | 10-063265 | 3/1998 |
| JP | 2001-299980 | 10/2001 |
| JP | 2003-085888 | 3/2003 |
| JP | 2003-108154 | 4/2003 |
| JP | 2003-177749 | 6/2003 |
| JP | 2003-177750 | 6/2003 |
| JP | 2005-87731 | 4/2005 |
| KR | 2002-0066418 | 8/2002 |
| KR | 2004-0027017 | 4/2004 |
| WO | WO-2004/072767 | 8/2004 |
| WO | WO-2005/071662 | 8/2005 |
| WO | WO-2005/082472 | 9/2005 |
| WO | WO-2006/072961 | 7/2006 |

* cited by examiner

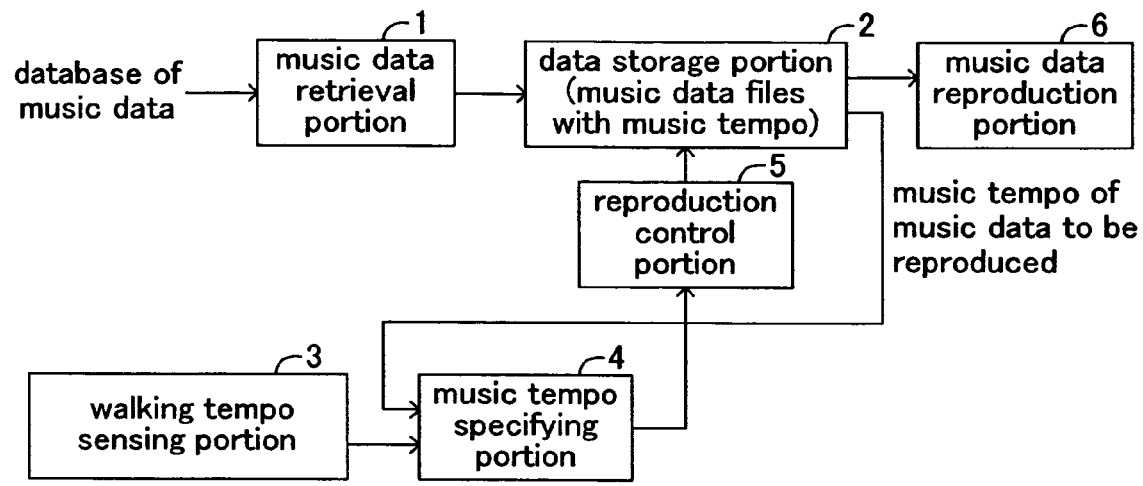
FIG.1A free mode
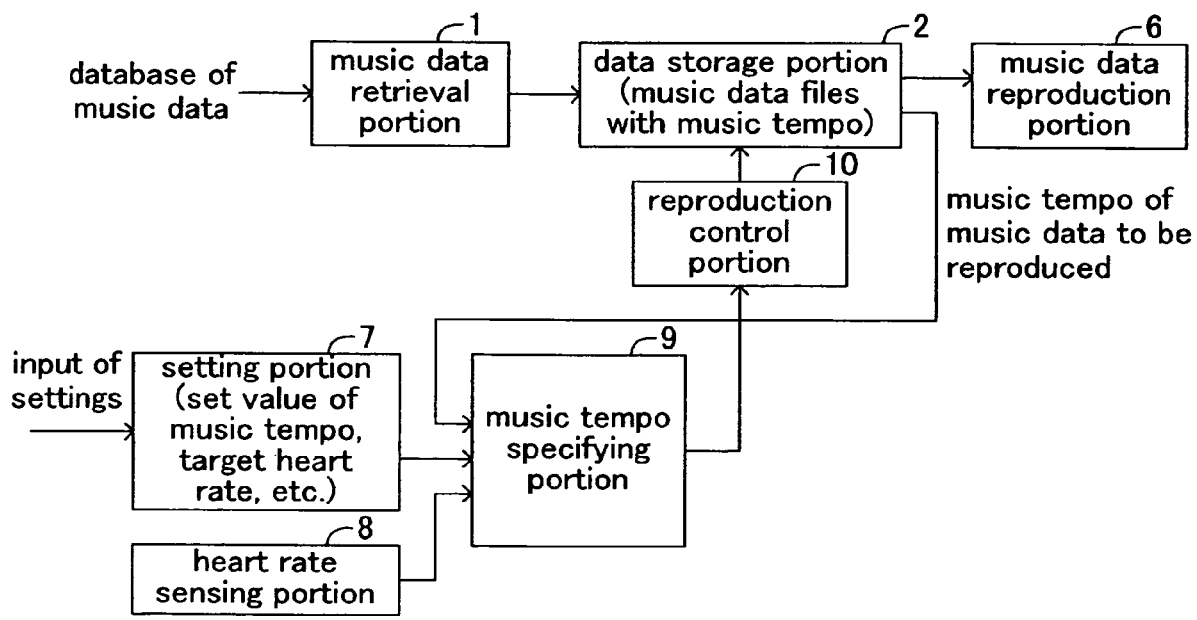
FIG.1B assistance mode

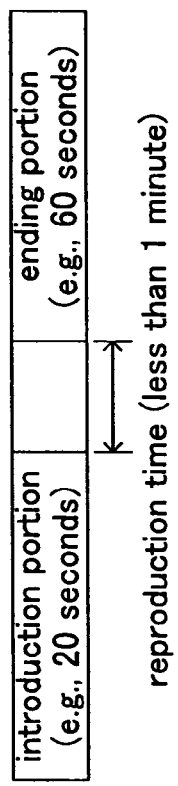
FIG.2A
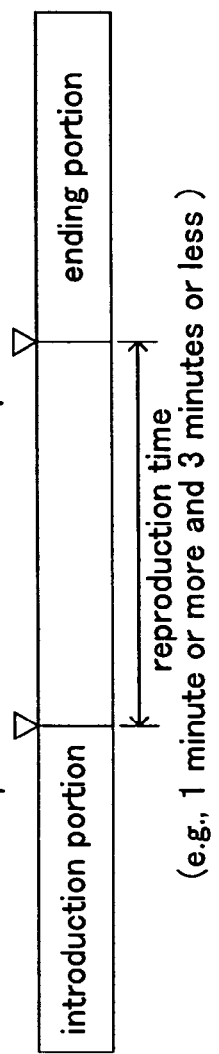
FIG.2B
FIG.2C

FIG.2F

| organization number | start address of music data | music data length | type (waveform) | music tempo | song impression | position to start reproduction | position to finish reproduction | beat position (1) | ... | other data |
|---|---|---|---|---|---|---|---|---|---|---|

FIG.2G

| organization number | start address of music data | music data length | type (MIDI) | music tempo | song impression | position to start reproduction | position to finish reproduction | other data |
|---|---|---|---|---|---|---|---|---| control of reproduction in free mode

FIG.8A

| basic setting items | date of birth, sex, height, weight, resting heart rate |
|---|---|
| setting items input prior to exercise | mode setting of exercise program<br>free mode<br>assistance mode<br>  walking mode<br>  jogging mode<br>  running mode<br>  interval mode |
| | duration of exercise |

FIG.8B  jogging mode

| exercise stage | duration [minute] | set music tempo value [BPM] | target exercise intensity [%] |
|---|---|---|---|
| warming-up1 | 1 | 145 | 50 |
| warming-up2 | 3 | 155 | 70 |
| jogging | 8 | 160 | 70 |
| cooling down1 | 1 | 150 | 65 |
| cooling down2 | 2 | 110 | 50 |

FIG.8C

| items displayed after exercise | run distance (previous exercise, cumulative distance)<br>cumulative distance for the day, week, month, and year<br>amount of running time (previous exercise, cumulative time)<br>amount of calories consumed<br>amount of burnt fat<br>physical strength age<br>others |
|---|---|

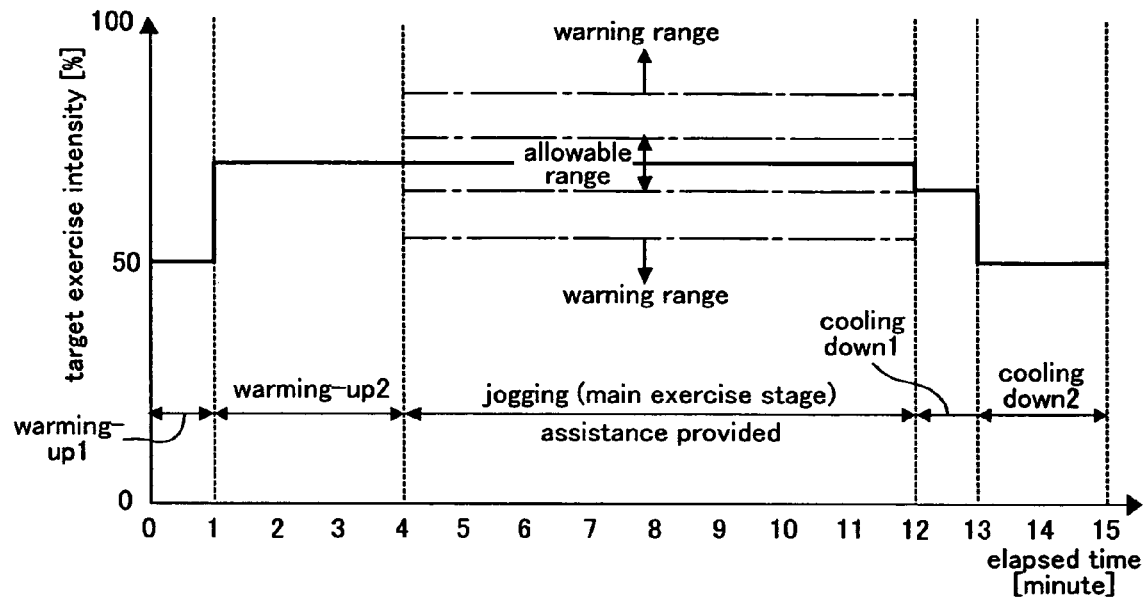
FIG.9A  target exercise intensity [%] in jogging mode
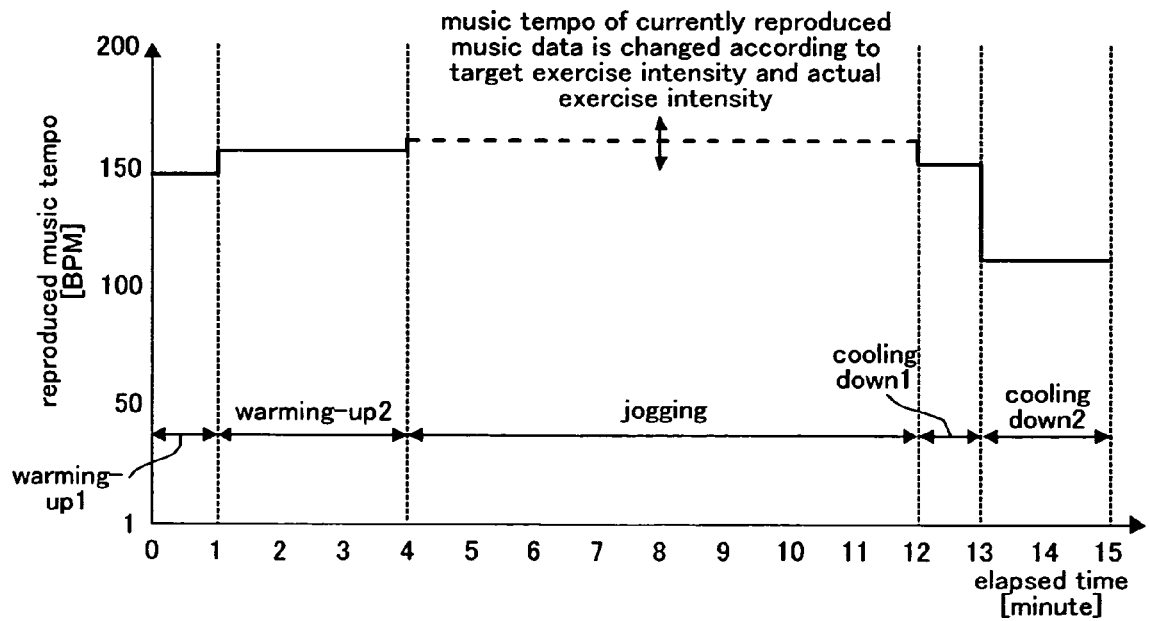
FIG.9B  music tempo [BPM] reproduced in jogging mode control of reproduction in assistance mode

APPARATUS FOR CONTROLLING MUSIC REPRODUCTION AND APPARATUS FOR REPRODUCING MUSIC

BACKGROUND OF THE INVENTION

1. Field of the Invention

The present invention relates to an apparatus for controlling music reproduction, the apparatus being suitable for situations where a user listens to the music while performing repetitive exercise such as walking and jogging. The present invention also relates to an apparatus for reproducing music, the apparatus using the apparatus for controlling music reproduction.

2. Description of the Related Art

There has been a conventional apparatus for reproducing music, the apparatus sensing a walking pitch (walking tempo) and modifying music tempo in accordance with the sensed walking tempo to provide a user who is walking while listening to the music with a sense of togetherness between his movements and the music (Japanese Patent Laid-Open Publication No. 2003-85888). There has been another conventional apparatus which, if a difference between the speed of the music in use (music tempo) and an average speed of steps (walking tempo) exceeds a certain value, modifies the speed of the music so that the difference is reduced by a certain ratio (Japanese Patent Laid-Open Publication No. 2003-177749).

The above-described conventional apparatuses only reproduce previously specified music at a modified tempo. In a case where the music is reproduced at a tempo significantly different from the original tempo, as a result, the conventional apparatuses force the user to listen to unnatural music which is quite different from the intention of a performer of the music. Since the conventional apparatuses simply modify a music tempo but fall short of changing user's mood, furthermore, the user gets tired of the music, resulting in his decreased willingness to continue the exercise. In a case where the music data was recorded as waveform data, moreover, a modification to music tempo causes changes in tone pitch and makes the user feel uncomfortable at the music unless the music data is subjected to special signal processing. In a case where the music was recorded as performance data such as MIDI (Musical Instrument Digital Interface) data, although a modification to music tempo does not cause changes in tone pitch, the music data recorded as performance data has less musical richness than the music data recorded as waveform data.

There has also been an apparatus called running pacemaker (a conventional art described in Japanese Patent Laid-Open Publication No. 2001-299980). This apparatus allows a user to specify the highest and lowest values of his allowable pulse, and his desired pace (running pitch), so that the output pace of electronic tones output by a variable frequency circuit decreases when his pulse exceeds the specified highest value, while the output pace of electronic tones increases when his pulse falls below the lowest value.

Furthermore, there has been a conventional exercise support apparatus which uses music data instead of electronic tones, and modifies tempo (music tempo) through the use of a sensor for sensing motion tempo (running tempo) (see Japanese Patent Laid-Open Publication No. 2001-299980). More specifically, this exercise support apparatus generates a function of target pulse time in accordance with values specified by the user, so that a modified tempo is obtained by adding a correction amount obtained by multiplying a difference $\Delta H(t)$ between a user's pulse and a target pulse by the original tempo and a coefficient A to a value obtained by multiplying the exercise tempo by a coefficient D. As a result, the exercise support apparatus achieves control of the user's pulse. Letting the coefficient A=0, the music tempo is modified to agree with the running tempo.

There has also been a conventional apparatus for reproducing music, the apparatus leading user's heart rate to an ideal heart rate by measuring user's heart rate to modify the speed of music (music tempo) when the difference between the measured heart rate and an ideal heart rate derived from user's information exceeds a certain value (see Japanese Patent Laid-Open Publication No. 2003-177750). In these above-described conventional arts as well, however, these apparatuses only reproduce previously specified music data at a modified tempo.

Furthermore, there has been an automatic performance apparatus which senses user's pulse to calculate the percentage of exercise load on the basis of the sensed pulse. In accordance with the percentage of exercise load of 70% to 100%, the automatic performance apparatus specifies a tempo coefficient P=1.0 to 0.7, selects one of automatic performance data files each of which has an original tempo slowing down in the order of the tempo coefficient P and is stored in correspondence with the tempo coefficient P, and reproduces the selected automatic performance data (see the second embodiment of Japanese Patent Laid-Open Publication No. H10-63265). As the exercise load rate increases, the automatic performance apparatus selects an automatic performance data file having a slower reproduction tempo (music tempo), resulting in the user also slowing down his jogging pace in harmony with the decreased music tempo. At each change in the tempo coefficient P, in addition, the automatic performance apparatus stops the currently reproduced song before starting a newly selected song from the beginning of the song. In order to switch to a newly selected song, furthermore, the automatic performance apparatus can also cross-fade the currently reproduced song and the newly selected song, or complete, in a more natural manner, the automatic performance of the currently reproduced song until the end of the song before starting the reproduction of the newly selected song.

As a result, the automatic performance apparatus switches the automatic performance data in accordance with exercise load rate but reproduces songs at their respective original tempos. From a user's point of view, however, the user only recognizes the current exercise load rate from the music tempo, but this apparatus does not affect his walking pitch in order to lead to the optimal exercise load rate. Since the reproduction tempo does not necessarily agree with the user's walking tempo, more specifically, exercise while listening to such music makes the user feel uncomfortable. If there is no change in the user's exercise load rate, furthermore, there is no change in the tempo coefficient P as well, resulting in the termination of the automatic performance at the end of the reproduction of the currently reproduced song.

There has also been a distribution apparatus (see Japanese Patent Laid-Open Publication No. 2003-108154). This distribution apparatus transmits time TC elapsed from the beginning of exercise, an exercise intensity m, a heart rate S, a walking tempo T to a distribution site every time a user walks for a certain distance, while the distribution site searches for song data having a tempo (music tempo) providing the user with a most suitable exercise load, distributes the found song data to allow a tone generator of a terminal apparatus to reproduce the song data. More specifically, the distribution is done such that a load heart rate F corresponding to the exercise intensity m is read out from a heart rate historical table TBL1 to multiply the walking tempo T by a tempo increase/ decrease coefficient C corresponding to a difference Δd between the load heart rate F and the user's heart rate S to obtain a load tempo TMP to retrieve song data having a tempo which approximately agrees with the load tempo TMP from a database.

Therefore, this conventional art realizes reproduction of song data having a tempo which approximately agrees with a walking tempo providing a user with an optimal exercise load. However, this conventional art requires access to a distribution site to download the song data, demanding a prolonged process delay for switching song data. In addition, both the intervals between the measurement of user's heart rate and the intervals between the switching of music data are the time required for the user to walk for a certain distance. In order to quickly respond to the changes in heart rate, as a result, the certain distance has to be short. If there is no change in heart rate over some period of time, however, reproduction of the same song from the beginning will be reiterated over the period of time with short intervals. In addition, intervals between the switching can vary, depending on user's walking tempo. Moreover, this conventional art requires a sensor for measuring the walking tempo T. Furthermore, this conventional art has not yet considered how the song data files are stored and how a song data file having a tempo which approximately agrees with the load tempo TMP is retrieved by the distribution site.

There has also been a conventional art for prompting a user to do exercise which naturally quickens the user's heart rate (see Japanese Patent Laid-Open Publication No. 2005-87731). When the user's instant heart rate falls below the lowest heart rate of a target exercise range during his exercise, more specifically, this conventional art provides the user with a song of a rhythm faster than the current instant heart rate (beat falling within a range from the lowest heart rate to a mean heart rate of the target exercise range) to make the user recognize his low heart rate, prompting the user to do exercise in harmony with the song having the rhythm faster than the current heart rate. However, the rhythm (beat) of a song merely tells the user that his instant heart rate is lower than the lowest heart rate of the target exercise range, but will not be modified with consideration given to walking tempo or the like. Therefore, the beat of the song does not agree with user's walking tempo.

SUMMARY OF THE INVENTION

The present invention was accomplished to solve the above-described problems, and an object thereof is to provide an apparatus for controlling music reproduction, an apparatus for reproducing music, and a program for controlling music reproduction suitable for cases where a user performs repetitive exercise while listening to the music. In addition, another object of the present invention is to provide an apparatus for controlling music reproduction, an apparatus for reproducing music, and a program for controlling music reproduction, the apparatuses and program enabling reproduction of music which leads the user to perform repetitive exercise at his target exercise intensity or his target heart rate.

It is a first feature of the present invention to provide an apparatus for controlling music reproduction, the apparatus comprising a repetitive tempo sensing portion for sensing a repetitive tempo during user's repetitive exercise; a music tempo specifying portion for specifying a music tempo value corresponding to the repetitive tempo; and a reproduction controlling portion for selecting a music data file having a music tempo value corresponding to the specified music tempo from among a plurality of music data files stored along with data on music tempo of the respective music data files in a data storing portion, and causing start of reproduction of the selected music data file.

The apparatus having the first feature enables reproduction of a music data file having a music tempo corresponding to a repetitive tempo. Since the music tempo of a music data file to be reproduced is determined according to the repetitive tempo of the repetitive exercise, the user is allowed to listen to the music without any deleterious effect on the repetitive exercise.

When a sensed repetitive tempo value falls outside a certain range extending from the music tempo value of a currently reproduced music data file, the music tempo specifying portion may specify a music tempo value agreeing with the repetitive tempo value. In this case, this apparatus is designed to prevent slight changes in repetitive tempo value from causing frequent switching of music data files, for frequent switching between music data files is disagreeable to the user's ear and makes the user uncomfortable.

When a state where a repetitive tempo value falls outside a first certain range extending from the music tempo value of a currently reproduced music data file is kept, and then a state where fluctuations of the repetitive tempo fall within a second certain range is kept, furthermore, the music tempo specifying portion may specify a music tempo value corresponding to the repetitive tempo. In this case, the apparatus can avoid switching of music data caused by slight changes in the repetitive tempo. More specifically, the apparatus is designed to wait for stable walking steps without frequently switching between music data files. As a result, frequent switching between music data files which is disagreeable to the user's ear and makes the user uncomfortable is prevented.

In the apparatus for controlling music reproduction having the first feature, if the repetitive tempo value suddenly decreases, the reproduction controlling portion may temporarily stop the reproduction of the music data file until recovery of the repetitive tempo value. In a case where the user stops walking for a short period of time or the like, the apparatus avoids temporarily reproducing a music data file having a slow music tempo which is not intended by the user.

Instead of the above-described scheme, if the music tempo value specified by the music tempo specifying portion suddenly decreases, the reproduction controlling portion may continue the reproduction of the currently reproduced music data file until recovery of the specified music tempo value. In this case, the apparatus can avoid decreased willingness to do exercise caused by silence.

In the apparatus for controlling music reproduction having the first feature, in addition, the apparatus may further include a setting portion for setting a music tempo for an exercise completion stage of the repetitive exercise, wherein the data storing portion stores, along with the plurality of music data files, song impression data representative of perceived degree of speed of music tempo of the respective music data files; the music tempo specifying portion specifies, at the exercise completion stage, the music tempo value for the exercise completion stage set by the setting portion; and at the exercise completion stage, the reproduction controlling portion searches song impression data of the plurality of music data files stored in the data storing portion, and selects a music data file having a music tempo value corresponding to the music tempo specified by the music tempo specifying portion from among one or a plurality of music data files having a song impression which makes music tempo perceived as slow. At the exercise completion stage, the apparatus does not change a music tempo in response to a repetitive tempo but adopts the forcefully specified music tempo, successfully leading the user to the cooling down stage. Because the apparatus reproduces a music data file having a song impression which makes the music tempo perceived as slow, which is suitable for the exercise completion stage, furthermore, the apparatus leads the user to the cooling down stage from a mental viewpoint as well.

In addition, the data storing portion may store, along with the plurality of music data files, song impression data representative of perceived degree of speed of music tempo of the respective music data files, while if the music tempo specifying portion specifies a music tempo faster than the music tempo value of a currently reproduced music data file, the reproduction controlling portion may search the song impression data of the plurality of music data files stored in the data storing portion and select a music data file having a music tempo value corresponding to the specified music tempo from among one more music data files having a song impression which makes the music tempo perceived as faster than the currently reproduced music data file, and if the music tempo specifying portion specifies a music tempo slower than the music tempo value of a currently reproduced music data file, the reproduction controlling portion may search the song impression data of the plurality of music data files stored in the data storing portion and select a music data file having a music tempo value corresponding to the specified music tempo from among one more music data files having a song impression which makes the music tempo perceived as slower than the currently reproduced music data file. In this case, since a change in music tempo made in accordance with a change in repetitive tempo entails a change in song impression made in accordance with the change in the music tempo, the user can perceive the change in the music tempo from a mental view point as well. As a result, the user is further provided with a sense of togetherness between his repetitive exercise and the music.

According to the present invention having the first feature, the pacing-up, pacing-down, and cooling-down of the user's repetitive tempo during repetitive exercise such as walking and jogging cause the switching between music data files so that the music tempo of a reproduced music data file corresponds to the user's repetitive tempo. As a result, the present invention makes the switching of music data files coincide with the switching of the user's feeling, reproducing music in harmony with user's feeling without impairment of his willingness to do exercise. Therefore, the present invention effectively provides the user with a sense of togetherness between his exercise and music. The present invention switches between music data files themselves, successfully changing the user's feeling without making him get tired of the music. Because music data files are reproduced at their original music tempos, furthermore, the present invention does not make the user feel uncomfortable. From a user's standpoint, the switching of reproduced music data files can be done by intentionally changing his repetitive tempo, without manipulating operators.

It is a second feature of the present invention to provide an apparatus for controlling music reproduction, the apparatus comprising a heart rate sensing portion for sensing heart rate during user's repetitive exercise; a setting portion for setting a music tempo and a target heart rate; a music tempo specifying portion for defining the set music tempo as an initial value, and specifying a value of the music tempo such that a difference between the sensed heart rate and the set target heart rate is reduced; and a reproduction controlling portion for selecting a music data file having a music tempo value corresponding to the specified music from among a plurality of music data files stored along with data on music tempo of the respective music data files in a data storing portion, and causing start of reproduction of the selected music data file.

The second feature changes the set initial value of the music tempo such that the user's heart rate becomes closer to the target heart rate. Since the user's heart rate depends on the exercise intensity, the user is allowed to do exercise at his target exercise intensity only by listening to the music. As a result, the apparatus having the second feature allows the user to do exercise which satisfies his purpose. The apparatus having the second feature eliminates the need for sensing repetitive tempo of the repetitive exercise, and allows the user to do repetitive exercise at the exercise intensity of the target heart rate only by changing his repetitive tempo so that his repetitive tempo coincides with the music tempo. Since the sensing of repetitive tempo entails noise and slight fluctuations, the second feature which does not require the sensing of repetitive tempo eliminates influences caused by such noise and slight fluctuations.

If the heart rate sensed by the heart rate sensing portion falls outside a certain range extending from the target heart rate set by the setting portion, the music tempo specifying portion may change the specified music tempo value with reference to the music tempo value of a currently reproduced music data file such that the difference between the heart rate and the target heart rate is reduced. In this case, this apparatus is designed to prevent slight changes in the heart rate from causing frequent switching of music data files, for frequent switching between music data files is disagreeable to the user's ear and makes the user uncomfortable.

In addition, if the heart rate falls outside a first certain range extending from the target heart rate, the music tempo specifying portion may change, with reference to the music tempo value of the currently reproduced music data file, the specified music tempo value such that the difference between the heart rate and the target heart rate is reduced, and cause the reproduction controlling portion to select a music data file having a music tempo value corresponding to the specified music tempo, while if the heart rate falls outside a second certain range extending from the target heart rate at the end of reproduction section of the currently reproduced music data, the second certain range falling within the first certain range, the music tempo specifying portion may change, with reference to the music tempo value of the currently reproduced music data file, the specified music tempo value such that the difference between the heart rate and the target heart rate is reduced, and cause the reproduction controlling portion to select a music data file having a music tempo value corresponding to the specified music tempo after completion of reproduction section of the currently reproduced music data file. In this case, if there is a significant difference between the heart rate and the target heart rate, the specified music tempo is changed to switch music data files, which leads the user to come to the target heart rate. If there is a slight difference between the heart rate and the target heart rate, on the other hand, the user is led to come close to the target heart rate, but the switching to the music data file having the newly specified music tempo is done after the completion of reproduction section of the currently reproduced music data. Therefore, frequent switching between music data files which is disagreeable to the user's ear and makes the user uncomfortable is prevented. As a result, the apparatus satisfies the need for leading the user's heart rate to the target heart rate (particularly, in a case where there is a risk caused by the heart rate which exceeds the target heart rate), as well as enabling the user to do exercise while enjoying listening to the music.

The apparatus for controlling music reproduction having the second feature may include a music tempo change instructing portion for instructing to change the music tempo value in accordance with user's manipulation during the repetitive exercise wherein the music tempo specifying portion changes the specified music tempo value to the instructed value and causes the reproduction controlling portion to select a music data file having a music tempo value corresponding to the newly specified music tempo, and the target heart rate set by the setting portion is changed in accordance with the music tempo value instructed by the music tempo change instructing portion. In this case, if the user has difficulty in making his repetitive tempo coincide with the music tempo due to excessively fast or slow music tempo, the user is allowed to change the music tempo by instructing the change in the music tempo value. Since the change in the music tempo value also causes a change in the target heart rate, the user's instruction made during exercise keeps effective for the continued exercise.

The apparatus for controlling music reproduction having the second feature may further include a beat sound generation specifying portion for specifying whether to generate beat sounds or not; and a beat sound generation controlling portion for generating the beat sounds at a music tempo value of a music data file being currently reproduced if the beat sound generation specifying portion has determined that the beat sounds are to be generated. When the user has difficulty in grasping the music tempo and therefore fails to make his repetitive tempo coincide with the music tempo, the apparatus generates beat sounds at the specified music tempo to help the user grasp the music tempo. The apparatus is to reproduce the music data file along with the beat sounds, but may disable (mute) the output of the reproduction of the music data file.

The apparatus for controlling music reproduction having the second feature may further include a repetitive tempo sensing portion for sensing a repetitive tempo during user's repetitive exercise; and a beat sound generation controlling portion for generating the beat sounds at a music tempo value specified by the music tempo specifying portion if a repetitive tempo sensed by the repetitive tempo sensing portion falls outside a certain range extending from the music tempo specified by the music tempo specifying portion. The apparatus generates beat sounds at the specified music tempo, helping the user grasp the music tempo as well as letting the user know that his repetitive tempo falls outside the range. The apparatus is to reproduce the music data file along with the beat sounds, but may disable (mute) the output of the reproduction of the music data file.

The beat sound generation controlling portion may generate beat sounds such that at least an initial beat position of the beat sounds coincides with the beat position of the currently reproduced music data file.

The setting portion may set a music tempo for exercise start stage, and the music tempo specifying portion may specify, at the exercise start stage, the set music tempo value for the exercise start stage. At the exercise start stage, the user's heart rate is unstable because the heart rate gradually increases. Consequently, there is little need for changing the music tempo such that the difference between the heart rate and the target heart rate is reduced. At the exercise start stage, therefore, the music tempo is set at the set value. The music tempo for the exercise start stage may be either fixed or variable in accordance with the passage of time at the exercise start stage.

The setting portion may set a music tempo for exercise completion stage, and the music tempo specifying portion may specify, at the exercise completion stage, the set music tempo value for the exercise completion stage. At the exercise completion stage, the user's heart rate is unstable because the heart rate gradually decreases. Consequently, there is little need for changing the music tempo such that the difference between the heart rate and the target heart rate is reduced. At the exercise completion stage, therefore, the music tempo is set at the set value. The music tempo for the exercise completion stage may be either fixed or variable in accordance with the passage of time at the exercise completion stage.

The apparatus for controlling music reproduction having the second feature may further include a repetitive tempo sensing portion for sensing a repetitive tempo during user's repetitive exercise, wherein the music tempo specifying portion compares a repetitive tempo sensed prior to the exercise completion stage by the repetitive tempo sensing portion with the set music tempo value of the exercise completion stage and changes the set music tempo value for the exercise completion stage in accordance with the comparison result to specify the changed music tempo value at the exercise completion stage. The apparatus is allowed to correct the music tempo value at the exercise completion stage in accordance with the actual value of the user's repetitive tempo sensed prior to the exercise completion stage.

The apparatus for controlling music reproduction having the second feature further includes a setting portion for setting a music tempo for the exercise start stage of the repetitive exercise and a music tempo for the exercise completion stage of the repetitive exercise. In this case, the data storing portion stores, along with the plurality of music data files, song impression data representative of perceived degree of speed of music tempo of the respective music data files. The music tempo specifying portion specifies, at the exercise start stage, the music tempo value for the exercise start stage set by the setting portion; and at the exercise completion stage, the music tempo specifying portion specifies the music tempo value for the exercise completion stage set by the setting portion. At the exercise start stage, the reproduction controlling portion searches song impression data of the plurality of music data files stored in the data storing portion, and selects a music data file having a music tempo value corresponding to the music tempo specified by the music tempo specifying portion from among one or a plurality of music data files having a song impression which makes music tempo perceived as fast; and at the exercise completion stage, the reproduction controlling portion searches song impression data of the plurality of music data files stored in the data storing portion, and selects a music data file having a music tempo value corresponding to the music tempo specified by the music tempo specifying portion from among one or a plurality of music data files having a song impression which makes music tempo perceived as slow.

The data storing portion stores, along with the plurality of music data files, song impression data representative of perceived degree of speed of music tempo of the respective music data files. When the music tempo specifying portion specifies a music tempo which is faster than that of the currently reproduced music data file, the reproduction controlling portion may search the song impression data of the plurality of music data files stored in the data storing portion and select, from among one or more music data files having a song impression which makes the music tempo perceived as faster than the currently reproduced music data file, a music data file having a music tempo value corresponding to the specified music tempo. When the music tempo specifying portion specifies a music tempo which is slower than that of the currently reproduced music data file, the reproduction controlling portion may search the song impression data of the plurality of music data files stored in the data storing portion and select, from among one or more music data files having a song impression which makes the music tempo perceived as slower than the currently reproduced music data file, a music data file having a music tempo value corresponding to the specified music tempo. In this case, since a change in music tempo made in accordance with a change in repetitive tempo entails a change in song impression made in accordance with the change in the music tempo, the user is further provided with a sense of togetherness between his repetitive exercise and the music.

It is a third feature of the present invention to provide an apparatus for controlling music reproduction, the apparatus comprising a mode setting portion for setting music reproduction controlling function at free mode or assistance mode in accordance with user's selecting operation; a repetitive tempo sensing portion for sensing repetitive tempo during user's repetitive exercise at least when the music reproduction controlling function is set at the free mode; a heart rate sensing portion for sensing heart rate during user's repetitive exercise at least when the music reproduction controlling function is set at the assistance mode; a setting portion for setting a music tempo and a target heart rate when the music reproduction controlling function is set at the assistance mode; a music tempo specifying portion for specifying a music tempo value corresponding to a repetitive tempo sensed by the repetitive tempo sensing portion when the music reproduction controlling function is set at the free mode; while when the music reproduction controlling function is set at the assistance mode, defining the music tempo set by the setting portion as an initial value, and specifying a value of the music tempo such that a difference between the heart rate sensed by the heart rate sensing portion and the target heart rate set by the setting portion is reduced; and a reproduction controlling portion for selecting a music data file having a music tempo value corresponding to the music tempo specified by the music tempo specifying portion from among a plurality of music data files stored along with data on music tempo of the respective music data files in a data storing portion, and causing start of reproduction of the selected music data file.

The apparatus having the third feature selects, in the free mode, a music data file having a music tempo which follows a change in repetitive tempo, and reproduces the selected music data file at its music tempo (original tempo). As a result, the apparatus prevents the music tempo of reproduced music data file from affecting the repetitive tempo of the repetitive exercise, allowing the user to do the repetitive exercise while listening to the music. In the assistance mode, on the other hand, the apparatus changes the set initial value of the music tempo such that the heart rate becomes close to the target heart rate, allowing the user to do the exercise at the target intensity only by listening to the music data. The assistance mode eliminates the need for sensing of repetitive tempo of the repetitive exercise, and allows the user to do repetitive exercise at the exercise intensity of the target heart rate only by changing his repetitive tempo so that his repetitive tempo coincides with the music tempo. Since the sensing of repetitive tempo entails noise and slight fluctuations, the assistance mode which does not require the sensing of repetitive tempo eliminates influences caused by such noise and slight fluctuations.

According to the present invention having the second or third features, the user is led to the target heart rate (target exercise intensity) through user's intentional adjustment of his repetitive tempo for agreement with the music tempo of reproduced music data during repetitive exercise such as walking and jogging. As a result, the present invention provides the user with suitable exercise, preventing risks such as overloaded exercise. The present invention switches between music data files, successfully changing the user's feeling without making him get tired of the music. Because music data files are reproduced at their original tempos, furthermore, the present invention does not make the user feel uncomfortable. When the user desires to switch from a currently reproduced music data file to another one, in addition, the switching between reproduced music data files can be done by intentionally changing his heart rate, without manipulating operators.

In the apparatus for controlling music reproduction having one of the first through third feature, the plurality of music data files stored in the data storing portion may be recorded in waveform data type. The apparatus enables reproduction of enriched music.

In the apparatus for controlling music reproduction having one of the first through third feature, when one or more music data files having a music tempo falling within a certain range extending from a music tempo value specified by the music tempo specifying portion are stored in the data storing portion, the reproduction controlling portion may selects one of the one or more music data files. Even if the data storing portion does not store a music data file having a specified music tempo, the apparatus is allowed to select a substitute for the music data file. Therefore, the apparatus provides a high degree of flexibility in music data files to be stored in the data storing portion, being suitable for cases where the user retrieves his desired music data files and stores them in the data storing portion.

At the selection of a music data file, if the data storing portion stores a plurality of music data files having a music tempo falling within the certain range extending from the music tempo value specified by the music tempo specifying portion, the reproduction controlling portion may randomly select one of the music data files. Alternatively, if the data storing portion stores a plurality of music data files having a music tempo falling within the certain range extending from the music tempo value specified by the music tempo specifying portion, the reproduction controlling portion may give a higher priority to a music data file having a music tempo value which is the closest to the specified music tempo value (including a case where the music tempo value agrees with the specified music tempo value) and select the music data file from among the plurality of music data files. Even if the data storing portion stores a plurality of music data files having the same music tempo, these selection schemes enables the apparatus to select one of them. Therefore, the apparatus provides a high degree of flexibility in music data files to be stored in the data storing portion, being suitable for cases where the user retrieves his desired music data files and stores them in the data storing portion.

The plurality of music data files stored in the data storing portion are a plurality of music data files recorded in waveform data type and at least one music data file recorded in performance data type. If the data storing portion does not store any music data file of waveform data type having a music tempo falling within the certain range extending from the specified music tempo value, the reproduction controlling portion may select the music data file of performance data type and cause reproduction of the selected music data file of performance data type at the specified music tempo. According to the present invention, even if the data storing portion does not store any music data file of waveform data type having a music tempo falling within the certain range extending from the specified music tempo value, the apparatus is allowed to use the music data file of performance data type as a substitute for the waveform data type. Therefore, the apparatus provides a high degree of flexibility in music data files to be stored in the data storing portion, being suitable for cases where the user retrieves his desired music data files and stores them in the data storing portion.

The apparatus for controlling music reproduction having one of the first through third features may start reproduction of a music data file from the position subsequent to the end of the introduction portion. In many cases, the introduction portion of a music data file has a song impression which is different from that of the following portions of the music data file to make listeners recognize the start of the music. In some cases, furthermore, the introduction portion includes a section having no tone. Therefore, the scheme in which the introduction portion is not reproduced prevents the possibility that the user may lose his willingness to do the repetitive exercise.

In the apparatus for controlling music reproduction having one of the first through third features, at the end of the reproduction section of a selected music data file, the reproduction controlling portion may select a music data file having a music tempo value corresponding to a specified music tempo from among a plurality of music data files stored in the data storing portion and cause the start of the selected music data file. In this case, upon the completion of the reproduction section of the selected music data file because of the completion of certain reproduction time set for the selected music data file or the completion of the reproduction of the selected music data file, for example, the reproduction of the newly selected music data file is started. Even if the reproduction section of a selected music data file is completed during the exercise, as a result, the apparatus can automatically continue the music reproduction.

In addition, the reproduction controlling portion may complete the reproduction of the selected music data file before the reproduction of the ending portion of the selected music data file. In many cases, the ending portion of a music data file has a song impression which is quite different from that of the other portions of the music data file to make listeners recognize the end of the music. Therefore, the scheme in which the ending portion is not reproduced not to allow the user to recognize the end of the music does not disturb his repetitive exercise. In order to set the reproduction time of a selected music data, minimum reproduction time or maximum reproduction time, the reproduction time may be set by counting from the start of the song or by counting back from the end of the song. In either case, it is preferable to set the reproduction time excluding the introduction portion and the ending portion. The introduction portion and the ending portion may be determined on the basis of the analysis of the music data file. Alternatively, every music data file may have the same reproduction time across the board.

Furthermore, the reproduction controlling portion may reproduce the selected music data file including the ending portion when receiving instructions to terminate the reproduction of music data. In this case, when the reproduction controlling portion receives the instructions to terminate the reproduction of music data by sensing termination of user's repetitive exercise, or sensing user's operation of a switch for stopping reproduction, the reproduction including the ending portion provides the user with the mood of completion of the exercise. In a case where the exercise time, that is, the reproduction time is previously specified, the instructions to terminate the reproduction of music data are made before a point in time, at the latest, counted back from the end of the previously specified reproduction time to secure the time required for reproducing the ending portion. When the instructions are made, the remaining reproduction section is determined by counting back from the end position of the ending portion.

When the reproduction controlling portion causes reproduction of a newly selected music data file, the reproduction controlling portion may cause reproduction of a stopgap music data file before switching from a currently reproduced music data file to the newly selected music data file. If the stopgap music data file is a performance data type, the music tempo of the stopgap music data file may be changed from the music tempo value of the currently reproduced music data file to that of the newly selected music data file over a plurality of steps. As a result, the apparatus can provide the user with smooth switching between music data files. At the switching from the currently reproduced music data to the stopgap music data, and from the stopgap music data to the newly selected music data, furthermore, the cross-fading between the music data files achieves further smooth switching.

The apparatus for controlling music reproduction having one of the first through third features may further include a repetitive timing sensing portion for sensing repetitive timing of the repetitive exercise during the user's repetitive exercise, wherein the reproduction controlling portion causes reproduction of the selected music data file such that an initial beat timing of the reproduction section of the music data file coincides with the repetitive timing sensed by the repetitive timing sensing portion. Upon each selection of a music data file to start the reproduction of the music data file, the apparatus achieves coincidence between the user's repetitive timing and the initial beat timing of the reproduction section, eliminating user discomfort at the switching between music data files. As a result, the apparatus can provide the user with a sense of togetherness between his exercise and the music. Data on an initial beat timing of reproduction section of a music data file or data for estimating the beat timing may be previously stored along with the music data file in the data storing portion. The repetitive timing sensing portion and a portion for sensing repetitive tempo can be realized by use of output from the same sensor.

An apparatus for reproducing music may integrate, in addition to the apparatus for controlling music reproduction having one of the first through third features, the data storing portion; a music data retrieving portion for storing a music data file selected in accordance with user's operation along with data on music tempo of the music data file in the data storing portion; and a music data reproducing portion for reproducing a music data file selected by the apparatus for controlling music reproduction. The apparatus for reproducing music is capable of storing and reproducing music data by itself without the need for an external data storage device and an external apparatus for reproducing music data.

BRIEF DESCRIPTION OF THE DRAWINGS

FIG. 1A and FIG. 1B are diagrams showing a functional configuration of an embodiment of the present invention;

FIG. 2A through FIG. 2G are explanatory diagrams showing examples of data stored in a data storage portion shown in FIGS. 1A, 1B;

FIG. 8A through FIG. 8C are explanatory diagrams showing setting items, contents of the settings, and items displayed after completion of exercise;

FIG. 9A and FIG. 9B are explanatory diagrams showing optimal exercise intensity characteristics and set values of music tempo in jogging mode which is an example of the assistance mode;

DESCRIPTION OF THE PREFERRED EMBODIMENT

Figure 2D:
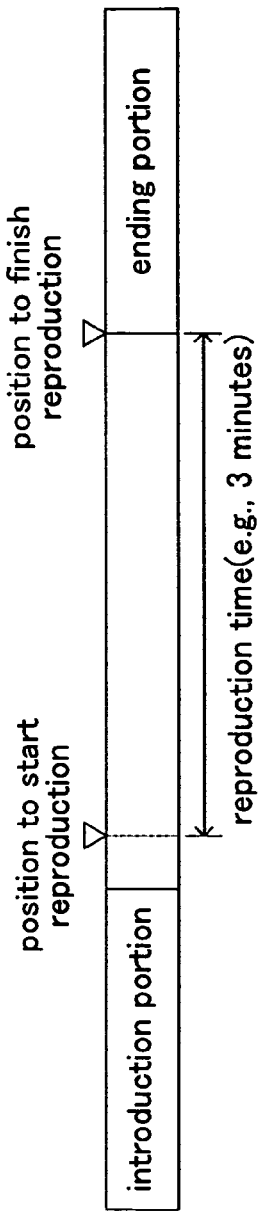

FIGS. 1A, 1B are diagrams showing a functional configuration of an apparatus for reproducing music, the apparatus including an apparatus for controlling music reproduction according to an embodiment of the present invention. This apparatus for reproducing music is used by a user to listen to the music while doing repetitive exercise. Hereinafter, a case where the user jogs, runs or the like will be described as a concrete example of the repetitive exercise. The apparatus for reproducing music provides the user with two broad modes of free (freely used) mode and assistance (exercise assistance) mode as a function of selecting music, allowing the user to enter the free mode or the assistance mode by his choosing operation. FIG. 1A is a functional block diagram of the music reproducing apparatus in the free mode, while FIG. 1B is a functional block diagram of the music reproducing apparatus in the assistance mode. In the free mode, the user freely walks or runs at his desired walking tempo or running tempo (hereinafter collectively called walking tempo) while listening to the music without being meddled in his walking tempo.

In FIG. 1A, a music data retrieval portion 1 retrieves a desired music data file selected by the user through his selecting operation from a database storing a multiplicity of music data files or from a multiplicity of music data files stored in a storage medium such as a CD (Compact Disk) to write the retrieved music data into a data storage portion 2. At the time of the retrieval, if the music data file to be retrieved contains data on original music tempo, the tempo data is also retrieved. If not, the music data is analyzed to extract an original tempo of the music. The music data retrieval portion 1 then writes the music data and the original music tempo into the data storage portion 2. Consequently, the data storage portion 2 stores a plurality of music data files along with their respective original music tempos. The respective music data files are reproduced at their respective original music tempos.

The above-described music data is preferably in a waveform data type, however, the music data may be in a performance data type such as MIDI data in which music data is stored as performance data representative of the pitch and tone length of a note. In this case, the music data of the performance data type has to contain data on original music tempo to enable the reproduction of the music data at the original music tempo. As described later, stored music data is in a waveform data type in principle, however, part of the music data may be in a performance data type.

A walking tempo sensing portion 3 senses walking tempo of user's walking or running. More specifically, the walking tempo sensing portion 3 senses the number of steps per a unit time period (e.g., 1 minute). The sensing of steps does not distinguish between the right foot and the left foot. In some cases, the walking tempo sensing portion 3 ignores temporarily largely fluctuating values, takes a moving average value of a plurality of steps, or performs processing of combining these two processes, and then outputs a resultant walking tempo.

A music tempo specifying portion 4 specifies a music tempo corresponding to a walking tempo sensed by the walking tempo sensing portion 3. More specifically, the music tempo specifying portion 4 specifies, when the value of the walking tempo sensed by the walking tempo sensing portion 3 falls outside a certain range provided for the music tempo value of music data currently being reproduced by a later-described music data reproduction portion 6, a music tempo having a value agreeing with the sensed walking tempo value. A reproduction control portion 5 selects a music data file having the music tempo specified by the music tempo specifying portion 4 from among a plurality of music data files stored in the data storage portion 2, and causes the music data reproduction portion 6 to reproduce the selected music data file. The music data reproduction portion 6 reproduces the music data file selected by the reproduction control portion 5.

The above-described certain range provided for the music tempo is defined as a range extending from the music tempo value of a currently reproduced music data file toward positive and negative directions by a certain amount, respectively. Alternatively, the above-described certain range may be defined as a range extending from the music tempo value of a currently reproduced music data file toward positive and negative directions by an amount equivalent to a certain ratio of the music tempo value, respectively. At the comparison between a walking tempo value and a music tempo value, a music tempo value specified by the music tempo specifying portion 4 may be used. Since a music tempo listened by the user is the music tempo value of the currently reproduced music data, the music tempo value does not necessarily agree with the specified music tempo value. Therefore, it is preferable to compare a walking tempo value with the music tempo value of a currently reproduced music data file.

As described above, the reproduction control portion 5 selects a music data file having a music tempo specified by the music tempo specifying portion 4 from among a plurality of music data files stored in the data storage portion 2 and causes the music data reproduction portion 6 to reproduce the selected music data file. However, the data storage portion 2 does not always store a music data file having the same music tempo value as the specified music tempo. In some cases, contrarily, the data storage portion 2 stores a multiplicity of music data files having the same music tempo value as the specified music tempo.

If the data storage portion 2 stores one or more music data files having a music tempo falling within a certain range extending from the specified music tempo value, therefore, the reproduction control portion 5 may select a music data file (initial selection) from the one or more music data files. At this selection, if the data storage portion 2 stores a plurality of music data files having a music tempo falling within the certain range provided for the music tempo value specified by the music tempo specifying portion 4, the reproduction control portion 5 may choose a music data file from the plurality of music data files on a random basis. In a case where there is only one music data file having a music tempo falling within the certain range, the music data file is to be chosen, but it can be considered that the music data file is chosen on a random basis.

If the same music tempo value is specified later again by the music tempo specifying portion 4, the reproduction control portion 5 randomly chooses a music data file, excluding the music data file which has already been chosen at random. If all the music data files having a music tempo falling within the certain range have been chosen, the reproduction control portion 5 chooses the music data file which has been chosen at the initial selection, and then makes the selections in the similar manner. In order to make the selections in such a manner, therefore, a history of the selections of music data files corresponding to a specified music tempo value is kept by the data storage portion 2.

Alternatively, if the data storage portion 2 stores a plurality of music data files having a music tempo falling within a certain range extending from a music tempo value specified by the music tempo specifying portion 4, a music data file having a music tempo which is the closest to the specified music tempo value (including a case where the music data file has the same music tempo as the specified music tempo value) may be given a higher priority to be chosen by the reproduction control portion 5. In a case where there is only one music data file which has a music tempo falling within the certain range, the one music data file is to be chosen, however, it can be also considered that the music data file having the closest music tempo is chosen in this case as well.

If the same music tempo value is specified later again by the music tempo specifying portion 4, the reproduction control portion 5 gives a higher priority to a music data file having a music tempo value which is the closest to the specified music tempo value, excluding the music data file which has already been chosen. If all the music data files having a music tempo falling within the certain range have been chosen, the reproduction control portion 5 chooses the music data file which has been chosen at the initial selection, and then makes the selections in the similar manner. If there are a plurality of music data files having the same music tempo value, the reproduction control portion 5 may choose one of them in a manner similar to the above-described random selection.

In order to switch music data files to be reproduced, in addition, the above-described reproduction control portion 5 may store a selection history of music data files (selection history which does not indicate specified music tempo values) so that if one or more music data files having a music tempo falling within a certain range extending from a music tempo value specified by the music tempo specifying portion 4 are stored, a music data file having the least number of selections is given a higher priority to be chosen from the one or more music data files on the basis of the selection history of the music data files. Even in cases where the same music tempo or music tempo values which are close to one another are consecutively specified or are specified again after a while, therefore, the above-described various schemes enable the reproduction control portion 5 to choose a different music data file at each selection, allowing the user to keep listening to the music without being bored.

In cases where the data storage portion 2 does not store music data files of waveform data type having a music tempo falling within a certain range extending from a specified music tempo value, the reproduction control portion 5 selects a music data file of a performance data type, which will be described later with reference to FIGS. 2A-2G. The music data reproduction portion 6 starts reproduction of the selected music data file of performance data type at the specified music tempo. As the music data files of performance data type, music data files whose original music tempo is uncertain may be stored. In a case where a plurality of music data files having a different original music tempo are stored as the music data of performance data type, a music data file having a music tempo which is the closest to the specified music tempo may be selected and reproduced at the specified music tempo.

At the time of the retrieval of a music data file from a database or the like by the music data retrieval portion 1 shown in FIG. 1A, the music data retrieval portion 1 retrieves music data of a song from the beginning to the end of the song and stores the whole song in the data storage portion 2. In this case, the time required to reproduce a song varies among songs. However, a certain time period during which a song is reproduced from the beginning of the song can be determined. Alternatively, a certain reproduction time period counted back from the end of a song may be determined. At the time of the retrieval of a music data file from a database or the like by the music data retrieval portion 1, in addition, only a desired section of a song such as a middle section of a song or a section excluding later-described introduction portion and ending portion may be stored in the data storage portion 2 through user's operation.

FIGS. 2A through 2G are explanatory diagrams showing example data files stored in the data storage portion 2 shown in FIG. 1A. Music data both in waveform data type and performance data type is stored as files each corresponding to a song, for example. As the music data files of waveform data type, files of WAV type (non-compressed waveform data type) are applicable. In addition, waveform data files compressed by various data compression methods such as MP3 (MPEG-1 Audio Layer-III) are also applicable as long as the music data reproduction portion 6 is capable of reproducing those files. As the music data files of performance data type, the SMF (Standard MIDI File) format in which a MIDI message and event timing data are recorded in a pair is applicable. Music data of performance data type can be used similarly to music data of waveform data type. In general, however, in the embodiment, music data of performance data type is used, as described above, when music data of waveform data type having a music tempo value corresponding to a specified music tempo is not stored. As described later with reference to FIG. 6 and FIGS. 9A, 9B, furthermore, as stopgap music data used at the time of switching of music data to be reproduced, short-time music data of performance data type is used in some cases.

FIG. 2A is an explanatory diagram showing a data configuration stored in a memory. The data storage portion 2 stores a plurality of music data files, which are organized by music organization data stored in the same data storage portion 2. In this figure, files of waveform data type and those of performance data type have their own storage area, respectively, however, these two different types may be stored altogether. FIG. 2B through FIG. 2E are explanatory diagrams showing example music data files stored in the data storage portion 2 according to the time length of the respective music data files. In a music data file, a header area precedes a music data area, for example, however, FIGS. 2B through 2E schematically show the music data area.

In general, a music data file has an introduction portion and an ending portion. The introduction portion is an introductory part performed before a theme. In the present specification, however, the introduction portion simply indicates the beginning part of a song. In some cases, due to composition techniques, the introduction portion has a different song impression from following parts, the song impression of the introduction portion allowing listeners to recognize the beginning of a song. The introduction portion can start with a period having no tone or can be performed only by accompaniment. The ending portion is a part preceded by a theme. In the present specification, however, the ending portion simply indicates the end part of a song. In some cases, due to composition techniques, the ending portion has a song impression which is quite different from other parts to allow the listeners to recognize completion of the song. The ending portion can be performed only by accompaniment or can end with a period having no tone.

In the embodiment of the present invention, therefore, the music data reproduction portion 6 reproduces, in principle, a section excluding the introduction portion and the ending portion of the respective music data files stored in the data storage portion 2. When the music reproduction is terminated because of completion of exercise, however, it is preferable to reproduce a song including its ending portion. The introduction portion and the ending portion can be detected through an automatic analysis of a music data file or identified by music experts. Alternatively, the introduction portion and the ending portion of each song may be simply distinguished on the basis of the time length. For example, it may be decided that the introduction portion is the first twenty seconds from the start position of each music data file, and the ending portion starts at the position counted back by sixty seconds from the end position of each music data file.

A music data file shown in FIG. 2B has reproduction time which is shorter than certain reproduction time of one minute, for example. Music data files having a too short reproduction time length result in frequent switching among music data files, making a listener uncomfortable to the ear. In the embodiment of the present invention, therefore, those music data files are not to be reproduced. The reproduction time of a music data file shown in FIG. 2C falls within the certain reproduction time of more than one minute and less than three minutes, for example. Therefore, the music data file is to be reproduced. The reproduction time of a music data file shown in FIG. 2D is more than three minutes, which exceeds the certain reproduction time. Therefore, the music data file is to be reproduced with a limit of three minutes which is the certain time. In the shown example, the reproduction section of the music data set is counted back from the start position of the ending portion to determine the reproduction section, however, the reproduction section may be determined from the end position of the introduction portion. Such limit on reproduction time length is imposed because reproduction of a song having long reproduction time tends to tire listeners. In cases where the number of music data files having a certain tempo value or a close tempo value is few, however, it is preferable to allow listeners to listen to a music data file as long as possible. Therefore, the limit on reproduction time length may be removed in any cases or in the cases where the number of music data files is few to define the reproduction section as a maximum section excluding the introduction portion and the ending portion.

The examples shown in FIG. 2B through FIG. 2D are based on the premise that each music data file has a roughly constant music tempo throughout each song. In an example of FIG. 2E, however, the music tempo of a song has at least one change which causes the music tempo to fall outside a certain allowable range (±5% or ±3 BPM, for instance). As a result, it is determined that the music tempo of FIG. 2E has changed. In this case, the respective reproduction sections within which the music tempo is roughly constant are used as separate music data files having a different music tempo. The separate use is available on condition that the reproduction section of the respective music data files has certain reproduction time of, for example, more than one minute and less than three minutes as in the case of FIG. 2C through FIG. 2D.

A music organization data portion shown in FIG. 2A is a database for organizing the above-described plurality of music data files. The music organization data portion also contains organization data necessary only in a case where a specific function is realized. FIG. 2F shows example organization data on a music data file of waveform data type, the organization data being contained in the music organization data portion.

Figure 2E:
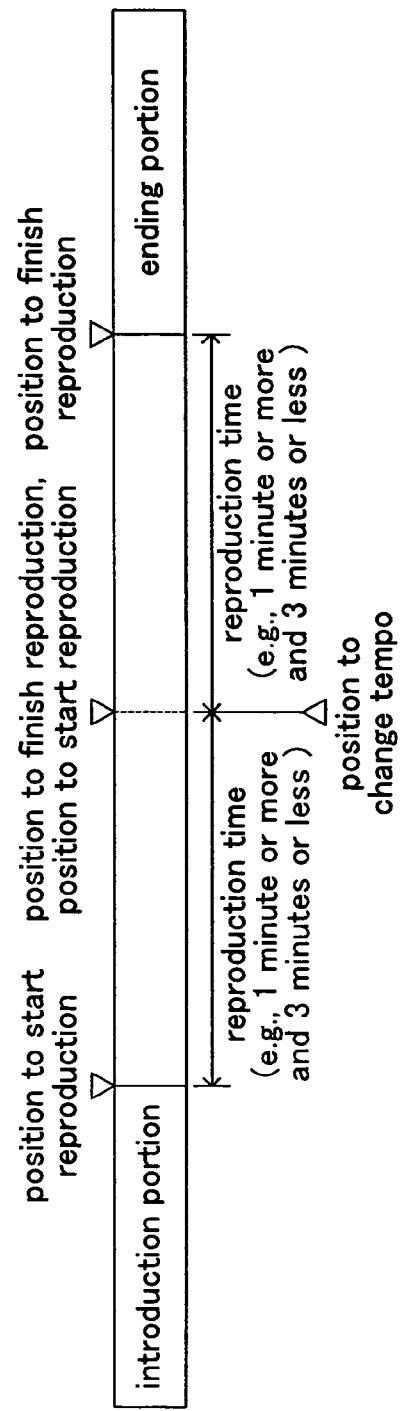

Organization number data represents a number provided to identify a music data file, however, the example of FIG. 2E has separate organization numbers for the first reproduction section and the second reproduction section. Music data start address data (start address of the music data file) and data on music data length (data length of the music data file) specify an area where the music data file is stored in the data storage portion 2. The first organization data and the second organization data of the example of FIG. 2E specify the same area. In a case where the storage area of a music data file can be identified on the basis of the music data file number, the music data file number may be described instead of the start address and the data length.

Type data indicates whether the music data file is in waveform data type or performance data type. Music tempo data indicates an original music tempo. In the example of FIG. 2E, the music tempo data contained in the organization data on the first reproduction section indicates the music tempo of the first half, while the music tempo data contained in the organization data on the second reproduction section indicates the music tempo of the second half. Song impression data represents the degree of the music tempo speed of the music data, the degree being perceived by listeners. The song impression data is provided because a numeric value of a music tempo disagree with a music tempo perceived by listeners in some cases, however, the song impression data is not indispensable in the present invention. Reproduction start position data represents a position at which reproduction starts, the position being shown in FIG. 2C through FIG. 2E. The reproduction start position data is represented by time or clock counted from the top position of song data. In the case of the organization data of the second half of the reproduction section of FIG. 2E, the reproduction start position represents a position at which the music tempo changes. Reproduction finish position data represents a position at which the reproduction finishes, the position being shown in FIG. 2C through FIG. 2E. The reproduction finish position data is represented by time or clock counted from the top position of song data.

Beat position data generally includes a plurality of beat position data sets of (1), (2), (3) . . . . The beat position (1) represents a position of the first beat measured from the top of the music data, being counted by time or clock. Similarly, the beat positions (2), (3), . . . represent respective positions of the following beats until the end of the song. More specifically, the beat positions (2), (3), . . . represent respective positions measured from the top of the song or calculated on the basis of a difference from an immediately preceding beat position. If all the beat positions contained in a song are described, however, the amount of the data will be massive. Therefore, the beat position data may be reduced such as one beat per bar or one beat for every few beats. Ignored beat positions can be estimated by interpolation. In cases where the introduction portion and the ending portion are not reproduced, in addition, beat positions only in a reproduction section may be described. In cases where set length of the introduction portion and the ending portion has been changed to a desired length, or in cases where the introduction portion and the ending portion are also reproduced, however, it is preferable to describe all the beat positions of a song. As for the organization data of the first half of the reproduction section of FIG. 2E, beat positions placed at the front of the position where the music tempo changes are described. As for the organization data of the second half of the reproduction section of FIG. 2E, beat positions placed behind the position where the music tempo changes are described.

FIG. 2G shows example organization data on a music data file of performance data type, the organization data being contained in the music organization data portion. Respective data on organization number, music data (file) start address and music data (file) length, music tempo, song impression, reproduction start position, and reproduction finish position are the same as those of the above-described waveform data shown in FIG. 2E. Type data indicates that the music data file is in performance data type. In performance data type, a beat position is determined or estimated on the basis of an event timing contained in note data, therefore, beat position data may not necessarily be described.

As explained above, the data storage portion 2 has the music organization data area, so that the reproduction control portion 5 refers to the organization table in order to read out a music data file. The reproduction control portion 5 then identifies a music data file which satisfies conditions and, refers to the start address and the data length of the identified music data file to read out the identified music data file. At the time of writing of a music data file into the data storage portion 2, therefore, the music data retrieval portion 1 retrieves not only the music data file but also organization data such as type data and music tempo data from an external apparatus. In a case where organization data is not available, the music data retrieval portion 1 analyzes the music data, obtains organization data on its own, and writes the obtained organization data into the music organization data area.

It can be considered that beat position data is a kind of performance data. Separately from a music data file, therefore, the data storage portion 2 may store a beat position data file. In this case, data for identifying the area of the beat position data file is contained in the music organization data. Instead of the above-described use of the music organization data, the header area or the like of each music data file may contain organization data such as type data, music tempo data and song impression data. At the time of reading of a music data file, in this case, the reproduction control portion 5 directly accesses music data files to find a music data file which satisfies conditions.

With reference to FIG. 1A again, explanation of the free mode will be continued. While the user's walking tempo is stable, the value of a music tempo specified by the music tempo specifying portion 4 is not changed.

As a result, the reproduction control portion 5 allows the music data reproduction portion 6 to reproduce the selected music data until the reproduction time of the music data expires, that is, the reproduction of the selected music data is terminated just before the ending portion. Upon completion of the reproduction section of the selected music data file, the reproduction control portion 5 causes the music data reproduction portion 6 to start reproduction of a newly selected music data file to enable automatically continued reproduction of music. Prior to completion of the reproduction section, therefore, the reproduction control portion 5 selects a music data file having a music tempo value corresponding to a specified music tempo from a plurality of music data files stored in the data storage portion 2. At the time of the selection, if the music tempo specified by the music tempo specifying portion 4 has not been changed, the subsequent music data file having the same music tempo value is selected.

When the reproduction control portion 5 has received instructions to terminate the reproduction of music data by sensing termination of user's waling or running, or sensing user's operation of a switch for stopping reproduction, it is preferable for the reproduction control portion 5 to allow the reproduction of a selected music data until the ending portion of the music data file to fit the termination of the exercise. For example, a repetitive exercise termination sensing portion which is not shown is provided to sense termination of repetitive exercise on the basis of the output sensed by the walking tempo sensing portion 3 (a state where the walking tempo is zero has continued for a certain time period or more) or on the basis of user's operation of the stop switch.

The above-described walking tempo sensing portion 3 may sense every walking step (start) timing (timing to start a step) in real time during user's walking or running and immediately output the sensed result. At the time of the first or subsequent reproduction of music data, the reproduction control portion 5 synchronizes the first beat timing of the reproduction section of a music data file with the step (start) timing sensed by the walking tempo sensing portion 3. Upon selection of a music data file and start of reproduction of the music data file, as a result, the user's step (start) timing coincides with the beat timing which comes first after the reproduction is started. As shown in FIG. 2C through FIG. 2E, a predetermined reproduction start point is not necessarily the first beat timing of a reproduction section. Therefore, the predetermined reproduction start point is placed at the front of the first beat timing. Instead of the predetermined reproduction start point, the reproduction start point may be the above-described first beat timing of the reproduction section. Wherever the reproduction start point is situated, interruptions of music reproduction can be prevented as far as the reproduction of the preceding music data file is continued until the reproduction of a subsequent music data file is started.

The above-described first beat timing of the reproduction section of the music data can be obtained on the basis of data on reproduction start position previously stored along with the music data in the data storage portion 2 and data on beat position shown in FIG. 2F. In a case where the beat position data is described for each beat, the first beat timing is the first beat position placed after the reproduction start position. In a case where beat position data is not described for each beat, however, a beat position appearing first after the reproduction start position is estimated by an interpolation process. The data on beat position shown in FIG. 2F is predicated on the use at the reproduction of beat sounds in the later-described assistance mode. The free mode is available as long as data for identifying the first beat position placed after the reproduction start position is stored.

In some cases, the user suddenly stops walking or running. On such occasions, a walking tempo value output from the walking tempo sensing portion 3 suddenly declines, resulting in a sudden decline of a music tempo value specified by the music tempo specifying portion 4. The sudden decline of the walking tempo value can be directly identified on the basis of the walking tempo value. In addition to the direct identification, the sudden decline of the walking tempo value can be indirectly identified on the basis of a music tempo value specified by the music tempo specifying portion 4. Upon sudden decline of the walking tempo value, the reproduction control portion 5 suspends the reproduction of the music data by the music data reproduction portion 6 until recovery of the walking tempo value. Alternatively, the reproduction control portion 5 may continue the reproduction of the currently reproduced music data until recovery of the walking tempo value. As described above, the reproduction control portion 5 specifies a music tempo in accordance with walking tempo, however, other musical tone properties of music data may also be controlled in accordance with walking tempo. For instance, the reproduction loudness may increase with increasing walking tempo. In accordance with walking tempo, furthermore, not only the music tempo but also other musical tone properties may also be controlled.

The organization data shown in FIG. 2F and FIG. 2G includes data on "song impression" representing the degree of speed of music tempo of each music data file perceived by listeners. Of a plurality of songs having the same music tempo, a "rhythmical song", a "cheerful song", and a "rousing song" are categorized as "up-tempo song". On the other hand, a "gentle song" and a "relaxing song" are relatively categorized as "down-tempo song". Therefore, song impression data is added to organization data with the rating in which the music tempo of each song is rated with "5" being perceived as the fastest and "1" being perceived as the slowest.

At the time of analysis of music data by an external apparatus or at the time of retrieval of music data from an external apparatus by the music data retrieval portion 1, a result of determination on song impression by the user is written to the organization data as song impression data. Alternatively, music data may be automatically analyzed to obtain the rating of perceptive speed of the music tempo of the music data.

In cases where the repetitive exercise is provided with an exercise completion stage, the above-described "song impression" data is used as a condition required for selection of a music data file by the reproduction control portion 5 shown in FIG. 1A, allowing the reproduction control portion 5 to select a music data file having a song impression suitable for the exercise completion stage. More specifically, a setting portion which is not shown in FIG. 1A forcefully sets a music tempo for the exercise completion stage. The music tempo specifying portion 4 then specifies the above-set music tempo value for the exercise completion stage.

The reproduction control portion 5 searches song impression data of a plurality of music data files stored in the data storage portion 2 to select, from one or more music data files having a song impression which causes the user to perceive the music tempo as slow, a music data file having a music tempo value corresponding to the music tempo specified by the music tempo specifying portion 4. Alternatively, music tempo data may be given a higher priority than song impression data, so that in a case where there are a plurality of music data files having a music tempo value corresponding to the specified music tempo value, a music data file which satisfies the condition on the song impression is to be selected.

The above-described "song impression" data can be also used for stages preceding the exercise completion stage as a condition required for selection of a music data file by the reproduction control portion 5 shown in FIG. 1A. At stages preceding the exercise completion stage, for example, the reproduction control portion 5 searches song impression data of a plurality of music data files stored in the data storage portion 2 to select, from one or more music data files having a song impression which does not cause the user to perceive the music tempo as slow, a music data file having a music tempo value corresponding to a music tempo specified by the music tempo specifying portion 4.

Alternatively, the reproduction control portion 5 may select, from among a plurality of music data files stored in the data storage portion 2, a music data file having not only a music tempo corresponding to the music tempo specified by the music tempo specifying portion 4 but also the song impression corresponding to a shift of music tempo specified by the music tempo specifying portion 4. When the music tempo specifying portion 4 specifies a music tempo faster than the music tempo value of the music data file being currently reproduced by the music data reproduction portion 6 (pacing up), more specifically, the reproduction control portion 5 searches the song impression data of the plurality of music data files stored in the data storage portion 2 to select, from among one or more music data files having a more up-tempo impression which is perceived as faster than the currently reproduced music data, a music data file having a music tempo value corresponding to the specified music tempo.

When the music tempo specifying portion 4 specifies a music tempo slower than the music tempo value of the music data file being currently reproduced by the music data reproduction portion 6 (pacing down), the reproduction control portion 5 searches the song impression data of the plurality of music data files stored in the data storage portion 2 to select, from among one or more music data files having a more down-tempo impression which is perceived as slower than the currently reproduced music data, a music data file having a music tempo value corresponding to the specified music tempo. The music tempo data may be given a higher priority than the song impression data, so that in a case where there are a plurality of music data files having a music tempo value corresponding to the specified music tempo value, a music data file which satisfies the condition on the song impression is to be selected.

Next, "assistance mode" will be explained with reference to FIG. 1B. The assistance mode described in the present specification is a mode for reproducing music data for the user so that the user' walking or running at a walking tempo agreeing with a music tempo of currently reproduced music data results in optimal exercise efficiency. In FIG. 1B, the same portions as those in FIG. 1A are given the same numeric characters as those given in FIG. 1A, respectively. On the basis of various kinds of personal data and a user's desired exercise mode input by the user, a setting portion 7 sets a music tempo and a target heart rate which are suitable for the user. The personal data and exercise mode input by the user will be described in detail, referring to FIG. 8. The target value to be set may be a target heart rate represented by use of a heart rate (e.g., heart rate per minute), however, the target value may also be a value of target exercise intensity (e.g., represented by [% HR Reserve], percentage with respect to estimated largest heart rate reserve capacity) obtained by converting a heart rate to an exercise intensity. In the latter case, a heart rate sensed by a heart rate sensing portion 8 is converted to a target exercise intensity for comparison.

In the present specification, therefore, a target heart rate or a heart rate includes a converted target exercise intensity. The above-described target heart rate is set at the same value for over the entire period of the user's walking or running, or for over the entire period of a certain exercise stage. Alternatively, the target heart rate can be set at a value variable in accordance with the passage of time. The set value of the above-described music tempo can be a value set at the start of walking or running, or a value set at the start of a certain exercise stage.

The heart rate sensing portion 8 senses a heart rate during user's walking or running. Since a heart rate and a pulse derive the same value, the embodiment of the present invention adopts "heart rate" as the terminology describing heart rate and pulse. In some cases, the heart rate sensing portion 8 reduces noise to obtain a moving average before outputting a resultant heart rate. A music tempo specifying portion 9 specifies a value of music tempo such that a difference between the heart rate sensed by the heart rate sensing portion 8 and the target heart rate set by the setting portion 7 is reduced, defining the music tempo set by the setting portion 7 as an initial value. With reference to the music tempo value of a currently reproduced music data, for instance, the music tempo specifying portion 9 specifies a music tempo value. The user is expected to walk or run to match his walking tempo with the music tempo value of currently reproduced music data. A reproduction control portion 10 selects a music data file having a music tempo value corresponding to the music tempo specified by the music tempo specifying portion 9 from among a plurality of music data files stored in the data storage portion 2 along with data on music tempo of the respective music data files. The reproduction control portion 10 then causes the start of the reproduction of the selected music data file.

When the heart rate sensed by the heart rate sensing portion 8 falls outside a certain range provided for the target heart rate set by the setting portion 7, more specifically, the music tempo specifying portion 9 modifies a music tempo value to specify with reference to the music tempo value of the currently reproduced music data file in order to reduce the difference between the heart rate and the target heart rate. The certain range of the target heart rate is defined as a range extending from the target heart rate toward positive and negative directions by a certain amount, respectively. Alternatively, the certain range may be defined as a range extending from the target heart rate toward positive and negative directions by an amount equivalent to a certain ratio of the target heart rate, respectively. A music tempo value which will be specified is defined as a value apart from the music tempo value of a currently reproduced music data toward positive and negative directions by a certain ratio of the music tempo value of the currently reproduced music data, respectively. Alternatively, a music tempo value which will be specified may be a value apart from the music tempo value of the currently reproduced music data toward positive and negative directions by a certain amount, respectively.

At the time of modification to a music tempo value which will be specified, the music tempo specifying portion 9 may make a change with reference to the music tempo value which is currently specified. Since a music tempo listened by the user is the music tempo value of the currently reproduced music data, the music tempo value does not necessarily agree with the specified music tempo value. Therefore, it is preferable to make a change on the basis of the music tempo of the currently reproduced music data.

When another music tempo is specified by the music tempo specifying portion 9, the reproduction control portion 10 may select a music data file having the another music tempo from among a plurality of music data files stored in the data storage portion 2, and cause a music data reproduction portion 6 to start reproduction of the selected music data file. However, this embodiment expects the user to walk at a walking tempo which agrees with the music tempo. Therefore, frequent changes of the music tempo, which put a burden on the user, are not preferable. In a case where the heart rate suddenly changes, on the contrary, in a case where the heart rate suddenly increases, particularly, it is necessary to decrease his walking tempo even during reproduction of a music data file in order to prevent overloaded exercise intensity. In order to satisfy the contradictory requirements, the embodiment is configured as described below.

If the heart rate sensed by the heart rate sensing portion 8 falls outside a first certain range extending from the target heart rate, the music tempo specifying portion 9 changes, with reference to the music tempo value of the currently reproduced music data file, a music tempo value which will be specified such that the difference between the heart rate and the target heart rate is reduced, and causes the reproduction control portion 10 to select a music data file having a music tempo value corresponding to the specified music tempo to cause the music data reproduction portion 6 to start reproduction of the selected music data file. In addition, if the heart rate falls outside a second certain range extending from the target heart rate at the end of reproduction section of currently reproduced music data, the second certain range falling within the first certain range, the music tempo specifying portion 9 changes, with reference to the music tempo value of the currently reproduced music data file, a music tempo value which will be specified such that the difference between the heart rate and the target heart rate is reduced, and causes the reproduction control portion 10 to select a music data file having a music tempo value corresponding to the specified music tempo after completion of reproduction section of the currently reproduced music data file, to cause the music data reproduction portion 6 to reproduce the selected music data file.

The above-described first and second certain ranges are defined respectively as a range extending from the target heart rate toward positive and negative directions by a first certain amount, respectively, and a range extending from the target heart rate toward positive and negative directions by a second certain amount, respectively. However, the first and second certain ranges may be defined respectively as a range extending from the target heart rate toward positive and negative directions by a first certain ratio of the target heart rate, respectively and a range extending from the target heart rate toward positive and negative directions by a second certain ratio of the target heart rate, respectively. In addition, a music tempo value which will be specified by the music tempo specifying portion 9 is defined as a value apart toward positive and negative directions with reference to a music tempo of a currently reproduced music data file by a certain ratio of this music tempo value, respectively. Alternatively, a music tempo value which will be specified may be defined as a value apart toward positive and negative directions by a certain amount, respectively, with reference to the music tempo value of the currently reproduced music data. An absolute value of the certain ratio and an absolute value of the certain amount provided for a case where the heart rate falls outside the first certain range extending from the target heart rate may be larger than those provided for a case where the heart rate falls outside the second certain range which falls within the first certain range.

There are cases where the user perceives the walking or running as hard or contrarily easy during exercise at a walking tempo agreeing with the music tempo of a currently reproduced music data file due to inappropriate settings of the initial value of the music tempo or the target heart rate, or the like. In order to handle such unexpected cases, this apparatus for controlling music reproduction is provided with music tempo change operators to be used by the user during his walking or running. The music tempo change operators include, for example, a "pacing-down button" which the user depresses when the exercise is too hard, and a "pacing-up button" which the user depresses when the exercise is too easy. In addition, a music tempo change instruction portion which is not shown is provided to detect operations of the above-described buttons to instruct the music tempo specifying portion 9 to change a music tempo value.

The music tempo specifying portion 9 immediately changes the specified music tempo value to the instructed value, while causing the reproduction control portion 10 to select a music data file having a music tempo value corresponding to the instructed music tempo, and change the target heart rate set by the setting portion 7 in accordance with the music tempo value instructed by the music tempo change instruction portion.

As a result, a depression of the "pacing-down button" causes a change of the music tempo to a slower one and a selection of a music data file corresponding to the slower music tempo, resulting in switching of music data file to be reproduced. When the "pacing-down button" is depressed, in addition, the target heart rate decreases. Even if a sensed heart rate is low, therefore, the music tempo will not be accelerated to the degree determined on the basis of the previous settings. A depression of the "pacing-up button" causes a change of the music tempo to a faster one and a selection of a music data file corresponding to the faster music tempo, resulting in switching of music data file to be reproduced. When the "pacing-up button" is depressed, in addition, the target heart rate increases. Even if a sensed heart rate is fast, therefore, the music tempo will not be slowed down to the degree determined on the basis of the previous settings. At the switching of music data file to be reproduced caused by the depression of these buttons, the music tempo may be immediately changed without cross-fading or without reproduction of stopgap music data.

Furthermore, when the music tempo and the target heart rate specified by the setting portion 7 have been changed in accordance with the music tempo instructed to change by the music tempo change instruction portion, the new settings after the change can be maintained even after the power is turned off. As a result, the user's instruction to change the music tempo provided during the exercise keeps effective even on resumed exercise. At the time of resumed walking or running, in other words, the present embodiment in the assistance mode appropriately helps each user with his exercise on an individual basis, using the initial value of the music tempo and the target heart rate affected by the user's depression of the "pacing-down button" or "pacing-up button".

Since the function of selecting a music data file by the reproduction control portion 10 is similar to that of the reproduction control portion 5 in the free mode shown in FIG. 1A, description of the function will be omitted. In some cases, as described above, a music tempo specified by the music tempo specifying portion 9 has been changed before the end of the reproduction of a reproduction section of a selected music data file. In such cases, the reproduction control portion 10 selects a music data file having a music tempo value corresponding to the newly specified music tempo from among a plurality of music data files stored in the data storage portion 2.

In the assistance mode shown in FIG. 1B as well, the walking tempo sensing portion 3 shown in FIG. 1A may be provided to have the function of sensing a step timing (step start timing) of walking or running during user's walking or running. At the time of the start of the first or subsequent reproduction of music data, as a result, the function enables the reproduction control portion 10 to synchronize the first beat timing of the reproduction section of a music data file to the sensed step timing. If the user is walking or running so that his step timing coincides with the beat timing of the currently reproduced music data file, the need for means for synchronizing beat timing to step timing can be eliminated, only requiring synchronization between the beat timing of the currently reproduced music data file and the beat timing of a subsequent music data file.

In addition, the music data reproduction portion 6 may include a beat sound generation portion, which generates beat sounds for a short period of time at the timings where beats appear. The generation of beat sounds can be also done by, for example, allowing the tone generator to reproduce performance data for emitting rhythm sounds such as percussion sounds, bass sounds, and metronome sounds at a variable music tempo. In some cases, during the above-described reproduction of music data files, the user has difficulty in grasping the music tempo of a song. As far as the user fails to grasp the music tempo, however, the user is unable to coincide his walking tempo with the music tempo.

Therefore, a beat sound generation specifying portion, which is not shown, for determining in accordance with user's operation for making choice whether or not to generate the above-described beat sounds is provided for the embodiment. If generation of the beat sounds is chosen, the beat sound generation portion allows generation of beat sounds at a music tempo specified by the music tempo specifying portion 9. The beat sounds are easier for the user to grasp the music tempo than music data, helping the user change his walking tempo to coincide with the music tempo. Along with the generation of the beat sounds, the music data reproduction portion 6 also reproduces a music data file, however, the music data reproduction portion 6 may disable (mute) the output of the reproduction of the music data file.

It is preferable that the beat sound generation portion generates the beat sounds at a music tempo value of the currently reproduced music data file with synchronization between the beat timing (beat position) of the currently reproduced music data and the first beat timing (beat position) of the beat sounds. The music tempo of a reproduced music data file is not necessarily constant. As the reproduction of music data advances, as a result, a significant phase shift can develop between the beat position of the music data and the beat position of the beat sounds. Therefore, it is preferable to bring the beat position of the beat sounds into phase with the beat position of the reproduced music data even while the reproduction of the music data is in process. Consequently, detection of the beat position of a currently reproduced music data file is required at the start of the reproduction as well as continuously.

In a case of music data of waveform data type, for example, beat positions are detected by automatic analysis of the music data. Alternatively, data on beat positions may be stored along with the music data in the data storage portion 2. As shown in FIG. 2F, more specifically, the music organization data for a music data file of waveform data type may have description of data on beat positions placed at least within a certain reproduction section of a song such as beat position (1), (2), (3), . . . . In a case where the reproduced music data is a performance data type, direct detection of beat positions or estimation of beat positions can be easily done on the basis of event timing contained in note data derived through analysis on the music data. As shown in FIG. 2G, therefore, there is no need to include data on beat positions in the music organization data.

In FIG. 1B, a function described below can be provided for the embodiment by adding the above-described beat sound generation portion and the walking tempo sensing portion 3 shown in FIG. 1A. The function causes generation of beat sounds at a music tempo value of a currently reproduced music data, when a walking tempo sensed by the walking tempo sensing portion 3 falls outside a certain range extending from a music tempo specified by the music tempo specifying portion 9. In this case as well, it is preferable to bring at least the first beat position of the beat sounds into phase with the beat position of the currently reproduced music data. The music data reproduction portion 6 also reproduces the music data concurrently with the beat sounds, however, the music data reproduction portion 6 may disable (mute) the output of the reproduction of the music data. In the free mode shown in FIG. 1A as well, the beat sound generation portion may generate the above-described beat sounds alone or together with music data. In the assistance mode as well, furthermore, the "song impression" data explained with reference to FIG. 2 can be used similarly to the case of the free mode.

Figure 3:
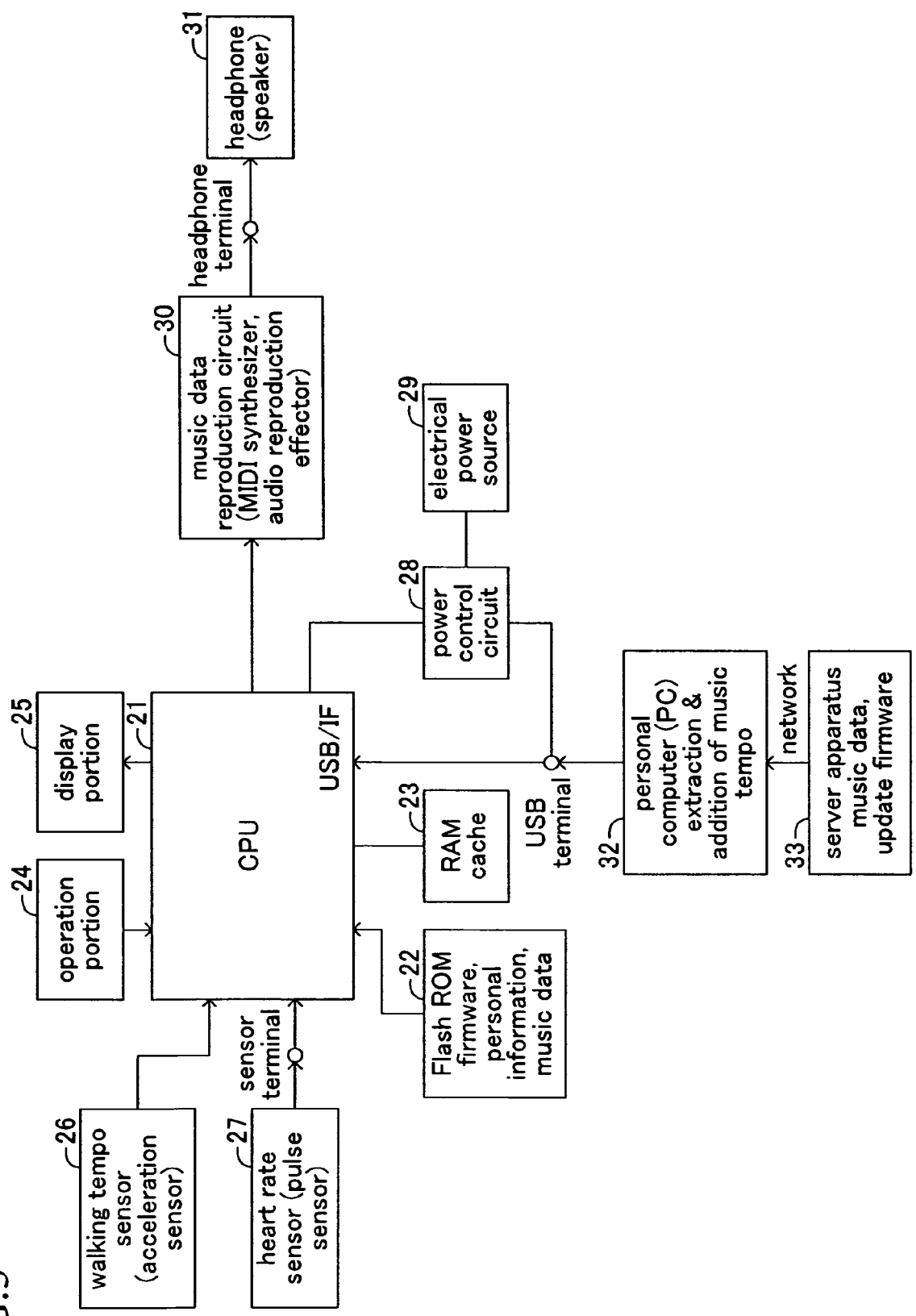
FIG. 3 is a diagram showing a hardware configuration which realizes the embodiment of the present invention shown in FIGS. 1A, 1B.

FIG. 3 is a diagram of a hardware configuration which realizes the embodiment of the present invention shown in FIGS. 1A, 1B. As one concrete example, FIG. 3 shows a case where the embodiment of the present invention is realized as a portable music player equipped with an acceleration sensor. This portable music player is suitable for a user jogging or running outdoors with the player on his waist or arm. Functions of this portable music player can be incorporated into a mobile phone terminal or a PDA (Personal Digital Assistant).

This apparatus is provided with a CPU (Central Processing Unit) 21, a Flash ROM (Read Only Memory) 22, and a RAM (Random Access Memory) 23. The CPU 21 realizes the functions of the present invention through the use of a control program stored in the Flash ROM 22. The RAM 23 is used as a temporary data storage area required by the CPU 21 to perform processing. The RAM 23 is also used as a cache memory for music data. The Flash ROM 22 is used as the data storage portion 2 shown in FIGS. 1A, 1B, storing a plurality of music data files of waveform data type or performance data type. The Flash ROM 22 may be replaced with a large-capacity compact hard magnetic disk.

When the CPU 21 selects a music data file from among the music data files stored in the Flash ROM 22, the selected music data file is temporarily stored in the RAM 23, which is used as a cache memory. In order to reproduce the music data file, the CPU 21 transfers the music data file stored in the cache memory to a music data reproduction circuit 30. An operation portion 24 includes buttons and switches for power-on/off, various selections and various settings. A display portion 25 includes a liquid crystal display for displaying input settings, status of music reproduction, and result of exercise, and light-emitting diodes for various instructions.

A walking tempo sensor 26, which is equipped with this apparatus, is a two-axes or three-axes acceleration sensor or a movement sensor which senses movement of the user's body, that is, an impact produced by a user's step with his right or left foot. As the walking tempo sensor 26, a known sensor applied to pedometer can be used. In a case where the walking tempo sensor 26 is an acceleration sensor itself, the CPU 21 executes an algorithm for extracting timings of walking steps to measure the time length of one step to calculate the walking tempo. However, the walking tempo sensor 26 may perform the measurement and calculation, and output the obtained walking tempo including, if necessary, the start timing of the walking step to the CPU 21. A heart rate sensor 27 is attached to a user's finger in a case where a pulse sensor is used. In a case where a heart rate meter is used, however, a heart rate meter integrated headphone or earphone is known.

A power control circuit 28 controls the power supply from an electrical power source 29 to the CPU 21 and a USB terminal. The music data reproduction circuit 30 inputs music data selected by the CPU 21 for the switching, converts the input music data to analog signals, amplifies the signals, and outputs the amplified signals to a headphone, earphone, speaker or the like. More specifically, the music data reproduction circuit 30 has a function of inputting waveform data to reproduce analog waveform data with a function of performing an expansion process if the waveform data is compressed waveform data such as MP3, and a MIDI synthesizer function of inputting performance data to reproduce analog waveform data. In either case, the music data reproduction circuit 30 also has an effector function to add an effect such as reverberation and echo.

A server apparatus 33 has a database in which music data is stored. A personal computer (PC) 32 accesses the server apparatus 33 via a network to allow the user to select a desired music data file from the database and to download the selected music data file. If the downloaded music data file does not contain data on music tempo, the personal computer 32 executes a program for extracting music tempo, and stores the extracted music tempo along with the downloaded music data in a memory of the personal computer (PC) 32. As for the music data whose music tempo changes at some midpoint as shown in FIG. 2E, the position where the tempo changes is also stored in the memory. As for song impression and beat positions (1), (2), . . . as well, respective analysis programs are executed to store respective results in the memory.

As for music data stored in an HD (Hard Disk) of the personal computer 32 and user's desired music data retrieved from a storage medium such as CD (Compact Disk) as well, the personal computer 32 may extract the above-described organization data such as music tempo and store the extracted organization data along with the music data. The art for analyzing music data of waveform data type to automatically extract music tempo has been disclosed in Japanese Patent Laid-Open Publication No. S64-21498 and Japanese Patent Laid-Open Publication No. H8-201542. What is disclosed in these publications is incorporated into the specification of the present invention. By the analysis of the music data, beat positions are obtained as timings at which the loudness level increases. In order to use song impression data for the selection of a music data file, the music data files are analyzed on the personal computer 32 by the user to determine the rating of song impression data of the music data files. Alternatively, the song impression of the respective music data files is determined by the person who makes the database, and stored as song impression data of the respective music data files in the database. The analysis of the song impression is known in the field of the art for automatic song selection for reproduction of music data.

In a music data retrieval mode, the CPU 21 transfers music data having organization data such as data on music tempo from the memory of the personal computer 32 via the USB terminal to the Flash ROM 22 to store the transferred music data. The above-described extraction and addition of organization data such as music tempo data, beat position data and song impression data may be done by program processing performed by the CPU 21. Furthermore, the extraction and addition may be done during direct recording of music recorded with a microphone onto the Flash ROM 22. In a case where the server apparatus 33 is provided with update firmware, in addition, firmware stored in the Flash ROM 22 can be updated through the personal computer 32. A plurality of music data files stored along with organization data such as music tempo in the Flash ROM 22 can be stored as preset data prior to shipment of this apparatus.

This apparatus can be realized as a stationary apparatus for indoor exercise such as running on a treadmill. In this case, this apparatus can be also realized by allowing a personal computer to execute an application program. The user wears the heart rate sensor (pulse sensor or heart rate meter integrated headphone or earphone) 27 to transfer output data via a cable or by radio to the main body of the apparatus. Reproduced music data may be output from a speaker of the main body of the apparatus. Alternatively, reproduced music data may be also output to the user's headphone or earphone via a cable or by radio. This apparatus can be used as an ordinary apparatus for reproducing music as well. Without consideration to the introduction portion and the ending portion, in this case, a music data file is reproduced as song data.

The above-described concrete examples have been described as an apparatus for reproducing music. By allowing an external apparatus to have the functions of reproducing music, storing music data, and writing music data, the present invention can be also realized as an apparatus for controlling music reproduction. When realized as the apparatus for controlling music reproduction, more specifically, the functions of reproducing music, storing music data, and retrieving music data are realized by an already available reproduction apparatus such as multimedia player, while the already available reproduction apparatus is provided with an interface for controlling reproduction of music.

By allowing the above-described apparatus for selecting music to freely add the functions of reproducing music, storing music data, and writing music data, furthermore, the music selecting apparatus can also be an apparatus having intermediate functions, falling short of the apparatus for reproducing music. In cases where music data is preset in the Flash ROM 22, which eliminates the need for downloading the music data from the database, the function of retrieving music data is not necessary.

Figure 4A:
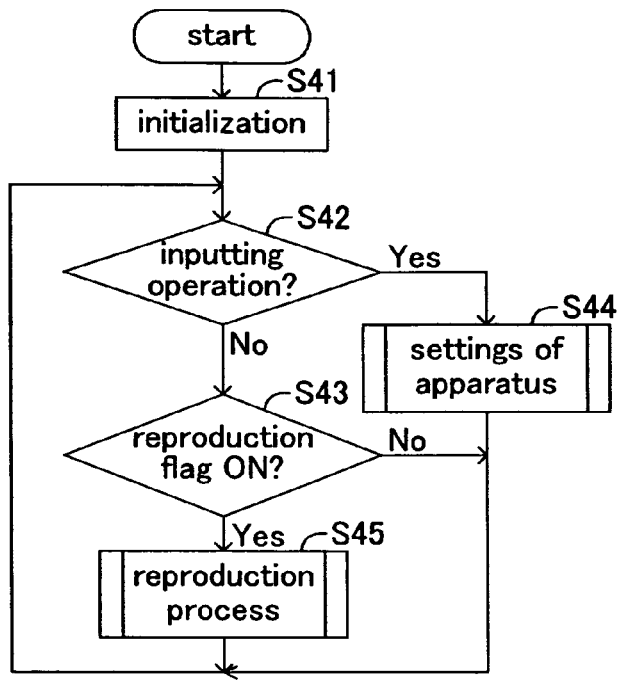
FIG. 4A through FIG. 4C are flowcharts each showing an example operation of embodiment of the present invention.

FIG. 4A through FIG. 12 are diagrams showing the embodiment of the present invention shown in FIG. 1 with a concrete example. Some of the drawings contain concrete values, however, these values are mere examples. FIG. 4A through FIG. 4C are flowcharts showing operational examples of the embodiment of the present invention. By executing the firmware, the CPU 21 shown in FIG. 3 carries out respective steps. A process shown in a flowchart of FIG. 4A is started by turning on the power switch. At S41 this apparatus is initialized. If there is no inputting operation at S42 with a later-described reproduction flag being ON at S43, at S45 the CPU 21 executes a reproduction process detailed in FIG. 4C in accordance with a set mode, monitoring the walking tempo and the heart rate. The process then returns to S42. If there is an inputting operation, a process for making settings of the apparatus detailed in FIG. 4B is executed at S44 to return to S42.

Figure 4B:
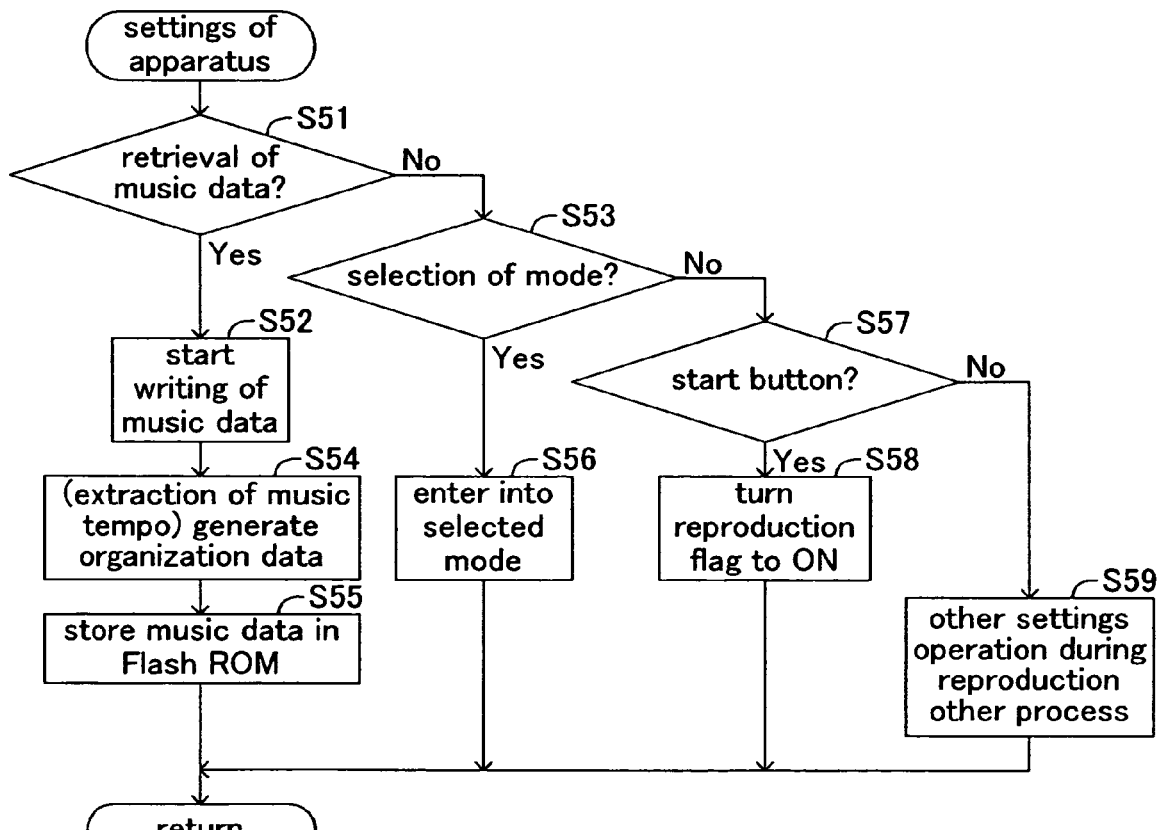

FIG. 4B is a flowchart showing a process for making settings of the apparatus (S44 of FIG. 4A). This process conducts retrieval of music data, selection of mode, and start/stop of reproduction in accordance with user's operation. If it is determined at S51 that the user's operation indicates retrieval of music data, the CPU 21 starts, at S52, writing of music data stored in the personal computer 32 into the Flash ROM 22. At S54, music organization data is written into the Flash ROM 22. In a case where the extraction of music tempo and the like is to be done by this apparatus, the music data is analyzed at S54. At S55, the music data is written into the Flash ROM 22.

If it is determined at S53 that the user's operation indicates selection of mode, the CPU 21 sets the mode of the apparatus at the mode selected by the user at S56. As described later with reference to FIG. 8, the free mode has one mode, however, the assistance mode has various modes. If it is determined at S57 that the user's operation indicates operation of start button, the CPU 21 turns the reproduction flag to ON at S58. While the reproduction flag is in ON, the reproduction process is executed. If it is determined at S57 that the user's operation indicates any other operation, user's operation shown in later-described FIG. 8 such as basic settings for individual user, settings prior to exercise, or operation made during reproduction of music is detected to execute a corresponding process at S59.

Figure 4C:
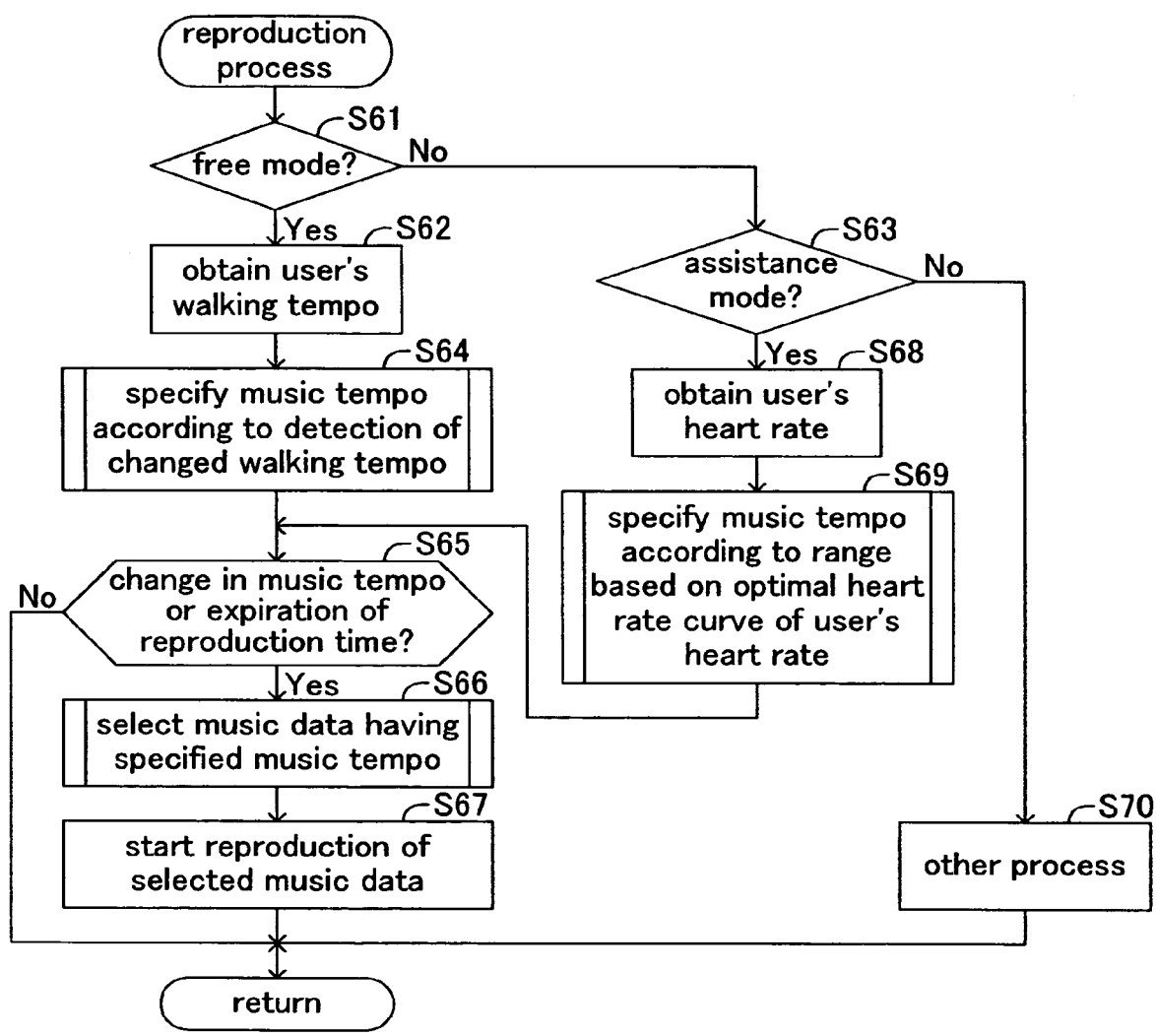

FIG. 4C is a flowchart of the reproduction process (S45 of FIG. 4A). If it is determined at S61 that the apparatus is in the free mode, the process proceeds to S62 to obtain user's walking tempo on the basis of the sensed result of the walking tempo sensor 26. At S64, if a change of the walking tempo is detected, another music tempo is newly specified (detailed description will be provided with reference to FIG. 5). At S65, if there is a difference between a previously specified music tempo and the newly specified music tempo, or if certain reproduction time of a currently reproduced music data expires, the process proceeds to S66 (detailed description will be provided with reference to FIG. 7) to search the Flash ROM 22 for selecting a music data file having a music tempo value corresponding to the newly specified music tempo to transfer the selected music data file from the Flash ROM 22 to the cache memory (RAM 23). At S67, the selected music data file is transferred from the cache memory to the music data reproduction circuit 30 to start the reproduction of the music data file.

If the apparatus is in the assistance mode, the process proceeds from S61, S63 to S68 to obtain user's heart rate (in some cases, moving average is calculated) on the basis of a sensed result of the heart rate sensor 27. At S69, a music tempo is specified in accordance with a range provided on the basis of the optimal heart rate curve of the user's heart rate (detailed description will be provided with reference to FIG. 10). Then, the process proceeds to S65 where if there is a difference between the previously specified music tempo and the newly specified music tempo, or if certain reproduction time of the currently reproduce music data expires, a music data file is selected to start the reproduction of the selected music data file. In this embodiment, however, the assistance mode has determination conditions for S65 which are different from those of the free mode. If the apparatus is in any other mode, the process proceeds from S61, S63 to S70 to perform other process. If the apparatus is in a mode where the apparatus reproduces music as an ordinary music player, music data is reproduced without consideration to the walking tempo and the heart rate.

Figure 5:
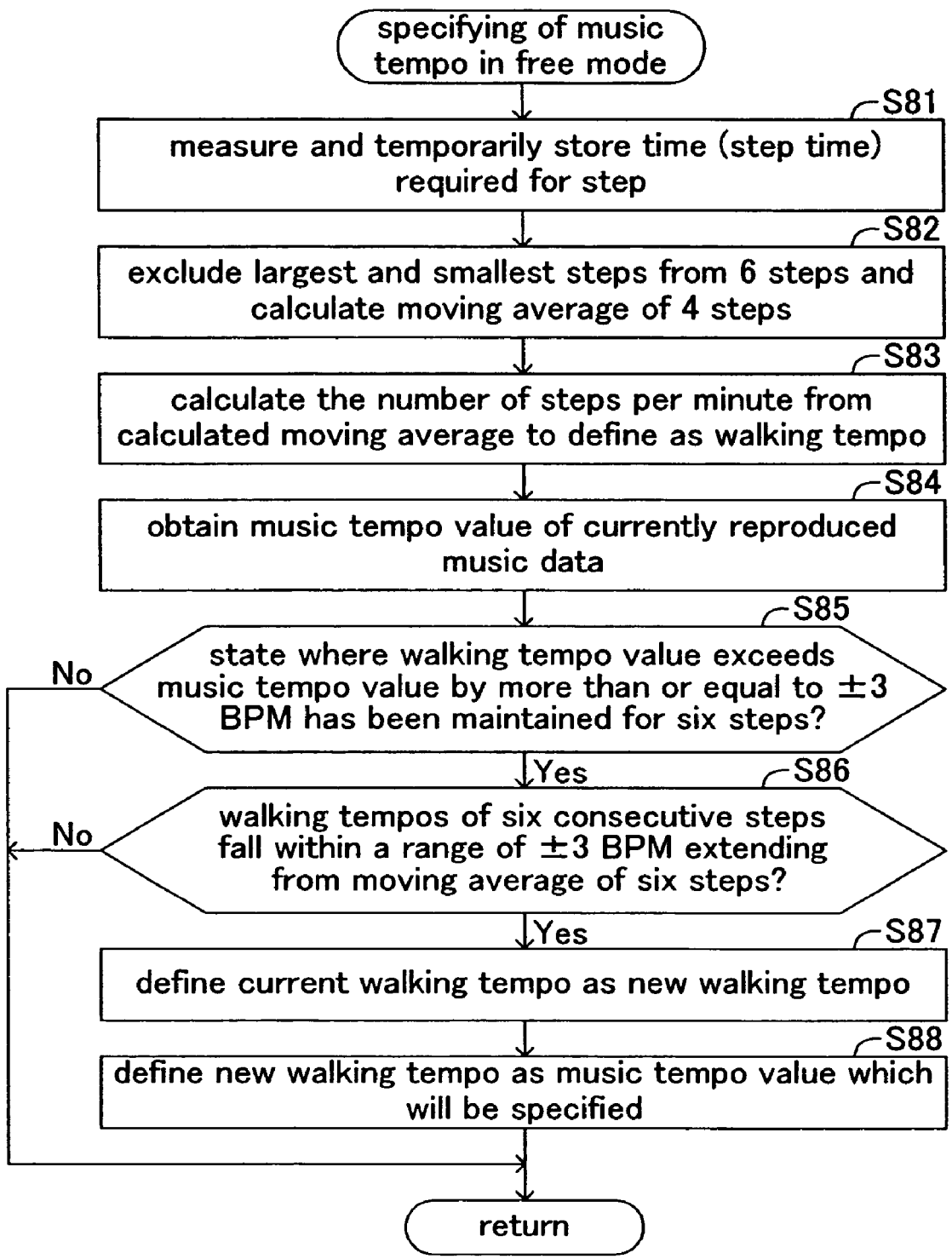
FIG. 5 is a flowchart detailing a process of S64 of FIG. 4C, the process specifying a music tempo in free mode.

FIG. 5 is a flowchart showing details of the process for specifying a music tempo in the free mode (S64 of FIG. 4C). In FIG. 5, a case where the walking tempo sensor 26 outputs a pulse indicative of a step (start) timing at each step will be explained. At S81, the CPU 21 measures the time (step time) required for a step of the walking, and temporarily stores the measured time for a plurality of steps in the RAM 23 or the like. At S82, from the last six steps, the steps having the largest value and the smallest value are excluded to obtain the moving average of step time of the remaining four steps for noise reduction. At S83, the number of steps per minute is calculated on the basis of the obtained moving average to define the calculated number of steps as the value of the walking tempo.

Then, a music tempo is specified. At S84, more specifically, a music tempo value of a currently reproduced music data file is obtained. At S85, it is determined whether a state in which a sensed walking tempo value exceeds the music tempo value of the currently reproduced music by more than or equal to ±3 BPM (Beats Per Minute) has been maintained for six steps, in other words, whether a state falling outside "the first certain range" has been maintained. The above-described state corresponds to a duration of three seconds in a case of the walking tempo of 120 BPM, or a duration of two seconds in a case of the walking tempo of 180 BPM.

If a positive determination is made at S85, the process proceeds to S86 to determine whether the respective walking tempos of six consecutive steps falls within a range of ±3 BPM extending from the moving average of the walking tempo of the six steps, in other words, whether a state in which fluctuations of the walking tempo fall within the "second certain range" has been maintained. If a positive determination is made at S86, the "current walking tempo" is defined as a new walking tempo at S87. The "current walking tempo" can be either the walking tempo value of the sixth step or the value of the moving average of the six steps. At S88, the new walking tempo value is defined as a music tempo value which will be specified. If the determination condition of either S85 or S86 has not been satisfied, a music tempo value which will be specified is not changed in this process.

In the above-described concrete example, the step of S82 eliminates influence caused by temporal fluctuations of each walking step. The step of S85 prevents slight changes in the walking step from causing frequent changes in the music tempo. The step of S86 is provided in order to wait for stable steps before specifying a new music tempo value, however, the step of S86 may be omitted. As a result, these steps avoid frequent switching of music data which makes the music disagreeable to the ear or makes the user uncomfortable.

The above-described first certain range is defined as a range extending from the music tempo value of a currently reproduced music data toward positive and negative directions by a first certain amount, respectively. However, the first certain range may be defined as a range extending from the music tempo value of the currently reproduced music data toward positive and negative directions by a first certain ratio of the music tempo value of the currently reproduced music data, respectively. The above-described second certain range is defined as a range extending from the moving average of the walking tempo toward positive and negative directions by a second certain amount, respectively. However, the second certain range may be defined as a range extending from the moving average of the walking tempo toward positive and negative directions by a second certain ratio of the moving average of the walking tempo, respectively.

Figure 6:
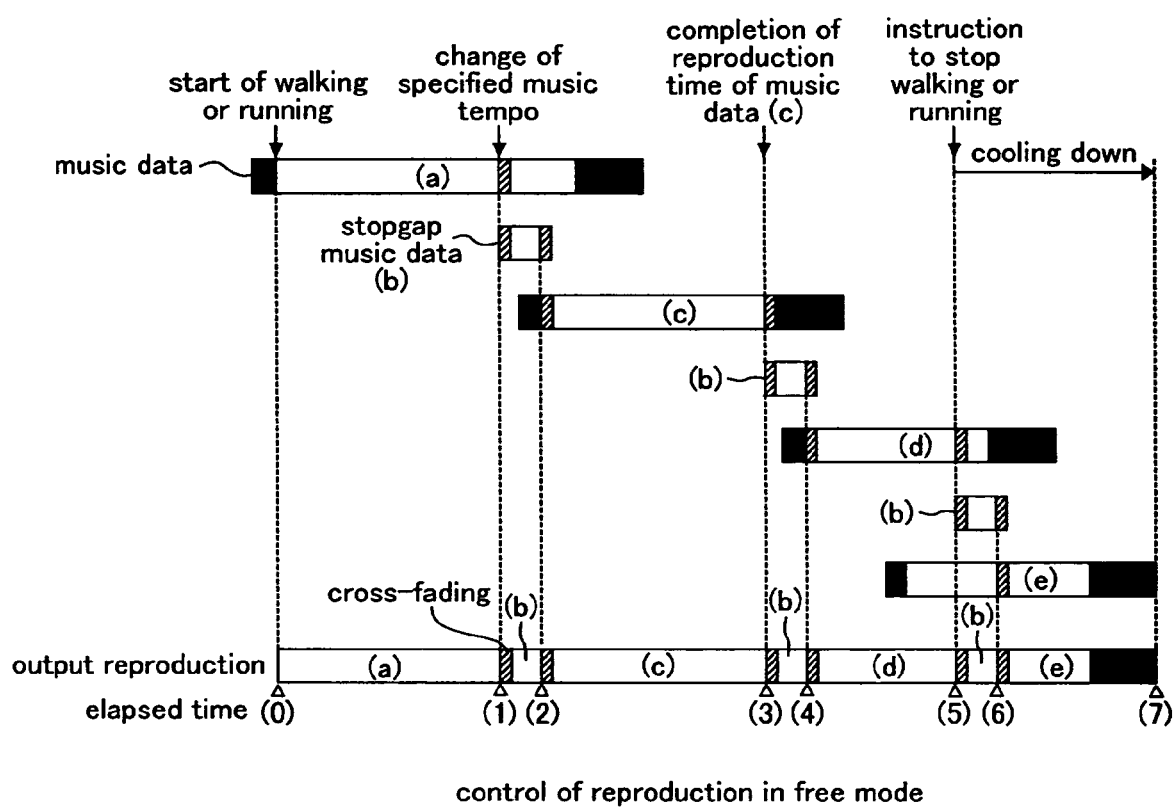
FIG. 6 is an explanatory diagram of a concrete example showing the control of reproduction of music data in free mode shown in S65 through S67 of FIG. 4C.

FIG. 6 is a diagram explaining, with a concrete example, control of the reproduction of music data shown in S65 through S67 of FIG. 4C. Respective blackened parts indicate sections of introduction portion or ending portion, while hatched parts indicate cross-fading sections. Music data files are provided with symbols (a) through (e). At the start of walking, a music data file (a) is selected and reproduced from the position subsequent to the end of an introduction portion preferably so that the first beat timing of the reproduction section of the music data file (a) coincides with a step timing. At elapsed time (1), the walking tempo falls outside a certain range, which results in a change in the music tempo which will be specified next, causing selection of a music data file (c) having a music tempo value corresponding to the new music tempo.

A switching method which is the easiest and develops no delay is to immediately start the reproduction of the music data file (c) from the position subsequent to the end of the introduction portion. However, a method in which the music data file (a) is also reproduced for a time period of a few seconds (e.g., five seconds) to cross-fade the two music data files brings about smooth connection between the songs. In this embodiment, in addition to the above method, smooth connection between songs is brought about by a method in which a stopgap music data file (b) is reproduced before the reproduction of the next music data file (c) is started at elapsed time (2).

The music data file (a) is cross-faded with the stopgap music data file (b), being followed by the reproduction of only the stopgap music data file (b). The stopgap music data file (b) is then cross-faded with the music data file (c), being followed by the reproduction of only the music data file (c). In the shown example, the cross-fading is done within reproduction time excluding the introduction portion and ending portion. Stopgap music data files may be waveform type, however, music data files of performance data type such as the above-described performance data for generating beat sounds can also be used, for performance data is easy to change its music tempo.

The reproduction control portion 5 causes the start of reproduction of the stopgap music data file (b) so that the music tempo and the beat timings of the music data (b) coincide with those of the previous music data file (a). The reproduction control portion 5 is capable of making changes to the music tempo of the stopgap music data file (b) over a plurality of stages so that the music tempo of the stopgap music data file (b) gradually reaches the music tempo of the subsequent music data file (c) at elapsed time (2). It is preferable that the reproduction control portion 5 determines the timing to start reproduction (elapsed time (2)) so that the first beat timing of the reproduction section of the subsequent music data file (c) coincides with the user's step timing. In addition, it is preferable that the reproduction control portion 5 controls the reproduction so that a beat timing of the stopgap music data file (b) coincides with the above-described first beat timing of the reproduction section. The reproduction time of the stopgap music data file (b) may be a fixed time period of approximately five to ten seconds. With consideration to the cross-fading with the subsequent music data file (c), however, the reproduction time of the stopgap music data file (b) may be a desired time period.

If the music data file (c) has been reproduced until certain reproduction time elapses (in the shown example, before the ending portion), the reproduction of the music data file (c) is completed. At the moment (at a point in time when a time period corresponding to the cross-fading has passed since elapsed time (3)) when the reproduction of the reproduction section of the currently reproduced music data is completed (however, it is necessary to move up due to process time), therefore, a music tempo is specified, so that the reproduction control portion 5 selects a music data file (d) having a music tempo value corresponding to the specified music tempo. At elapsed time (4), the reproduction control portion 5 then causes the start of reproduction of the music data file (d). In some cases, however, the music data file (c) is reproduced again. At the elapsed time (3) as well, the reproduction control portion 5 cross-fades the music data file (c) and the stopgap music data file (b). At the elapsed time (4), the reproduction control portion 5 cross-fades the stopgap music data file (b) and the music data file (d) to cause the start of the reproduction of the music data file (d) preferably so that the first beat timing of the reproduction section of the music data file (d) coincides with a step timing.

Next, description will be made about elapsed time (5) when an instruction to terminate the reproduction is input because it is determined on the basis of the walking tempo value sensed by the walking tempo sensor 26 that the user has stopped his walking, time reaches a certain point situated prior to a point when certain exercise time (reproduction time) expires, or the user has operated the stop button. In these cases, the reproduction of the currently reproduced music data (d) may be immediately stopped. Alternatively, the currently reproduced music data (d) including the ending portion may be reproduced. For example, when the user has operated the stop button once, the music data including the ending portion is to be reproduced. When the user has further operated the stop button again, the reproduction is to be immediately stopped.

In this embodiment, however, the scheme in which the currently reproduced music data file (d) including the ending portion is to be reproduced is replaced with a scheme which moves to a cooling down stage. More specifically, a certain music tempo is provided for the use in the cooling down reproduction. The music tempo specifying portion 4 specifies the provided music tempo, so that the reproduction control portion 5 selects a music data file (e) having a music tempo value corresponding to the specified music tempo. At elapsed time (6), the reproduction control portion 5 then causes the music data reproduction portion 6 to start the reproduction of the music data file (e) preferably so that the first beat timing of the reproduction section of the music data file (e) coincides with a step timing. From the elapsed time (5) to the end position of the cross-fading situated behind the elapsed time (6), the stopgap music data (b) is reproduced. In a case where the duration of the cooling down has been specified, the start position of the reproduction of the music data file (e) is determined on condition that the music data file (e) including the ending portion is to be reproduced. Then, at the elapsed time (6), the reproduction of the music data file (e) is started in a manner similar to the above. If a music data file is selected with consideration given to song impression in the above-described cooling down stage, the user is provided with mental effectiveness in the cooling down stage.

Figure 7:
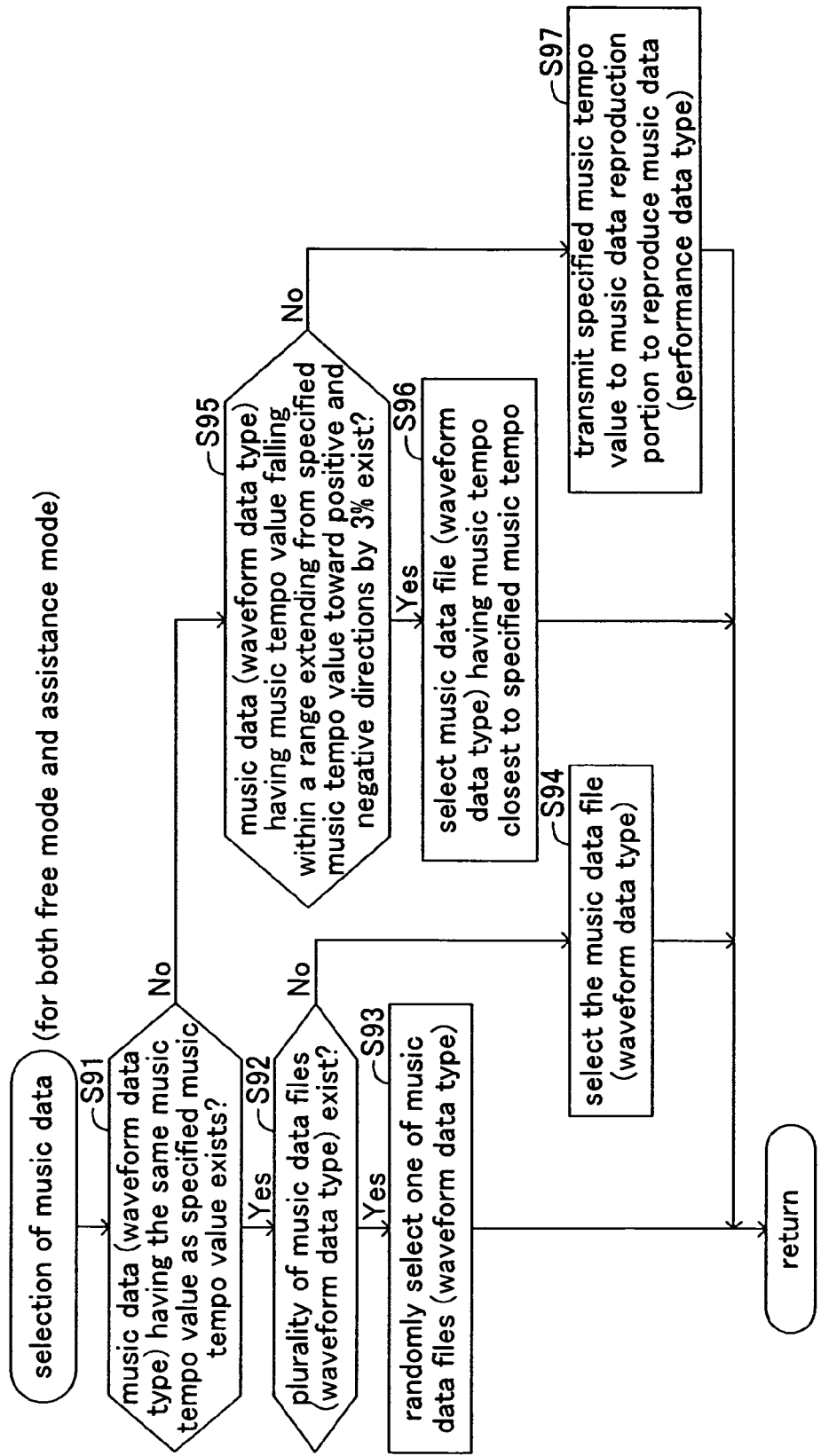
FIG. 7 is a flowchart detailing a process of S66 of FIG. 4C, the process selecting a music data file in free mode and assistance mode.

FIG. 7 is a flowchart detailing the selection of a music data file (S66 of FIG. 4C). This process is provided for both the free mode and the assistance mode. In contrast to the concrete example described with reference to FIGS. 1A, 1B, a concrete example assigning top priority to the use of a music data file having the same music tempo value as a specified music tempo will be described. At S91, the CPU 21 searches the Flash ROM 22 for a music data file (waveform data type) having the same music tempo value as a specified music tempo value. If there is, the CPU 21 moves to S92. If there are a plurality of music data files satisfying the condition, the CPU 21 moves to S93 to randomly select one of them. The history of selections is temporarily stored in a history table, so that while the specified music tempo is not changed to keep effective, the CPU 21 is to randomly select a music data file from the music data files excluding those which have already been selected. If the CPU 21 has already selected all the music data files satisfying the condition, the CPU 21 returns to the first selection.

In a case where one music tempo is changed to another music tempo, and then the one music tempo is specified again, the CPU 21 may continue the random selection of a music data file. In a case where the selection history is stored in the Flash ROM 22, the CPU 21 can continue the previous random selection of music data file even if the power of this apparatus has been turned off. If there are not a plurality of music data files at S92, the CPU 21 moves to S94 to select the found music data file.

At S91, S95, it is determined whether there is a music data file (waveform data type) having a music tempo value falling within a range extending from the specified music tempo toward positive and negative directions by 3% of the specified music tempo, respectively. If there are such music data files, the CPU 21 moves to S96 to select a music data file whose music tempo value is the closest to the specified music tempo value. In this case as well, the history of selections is temporarily stored in the history table, so that while the specified music tempo is not changed to keep effective, the CPU 21 selects a music data file having the closest music tempo value from among the music data files excluding those which have already been selected. If the CPU 21 has already selected all the music data files satisfying the condition, the CPU 21 returns to the first selection. Furthermore, in a case where the music tempo is changed to another music tempo, and then the music tempo is specified again, the CPU 21 may select a music data file having the closest value from the music data files falling within the range but excluding those which have already been selected. In addition, the selection history may be stored in the Flash ROM 22.

If it is determined at S95 that there is no music data file (waveform data type) falling within the range extending from the specified music tempo toward positive and negative directions by 3%, at S97 the CPU 21 selects a music data file (performance data type) whose music tempo value is the closest to the specified music tempo value, and transfers data on the specified music tempo to the music data reproduction circuit 30. The music data reproduction circuit 30 reproduces the transferred music data (performance data type) at the specified music tempo.

In the concrete example referring to FIG. 1A, if there are one or more music data files having a music tempo value falling within a certain range extending from the specified music tempo value, the reproduction control portion 5 randomly selects a music data file from the one or more music data files. This concrete example corresponds to a case where the process starts at S95. In this case, however, if a positive determination is made, the process performs S93, while if a negative determination is made, the process performs S97. In the flowchart shown in FIG. 7, the selection of a music data file is done with a higher priority being assigned to music data files of waveform data type than those of performance data type, however, the music data files of both data types may be treated equally at S91 through S95.

Next, the process of S69 of FIG. 4C for specifying a music tempo in the assistance mode will be described with a concrete example of setting items for this apparatus and items displayed after the exercise. FIG. 8A through FIG. 8C are explanatory diagrams showing setting items, options to specify, and items displayed after the exercise. The setting items are provided mainly for the assistance mode. FIG. 8A shows basic setting items and setting items specified prior to the start of exercise. As for resting heart rate, the user inputs the lowest value of his heart rate previously measured when he woke up with the heart rate sensor 27 attached to this apparatus or with a commercially available heart rate meter. The user is also required to input his largest heart rate. If the user does not know his largest heart rate, however, it can be obtained on the basis of input user's age by subtracting his age from 220 (that is, 220–age).

On the basis of the resting heart rate and the largest heart rate, n[%] of an estimated largest heart rate reserve capacity, that is, a heart rate corresponding to n % HR Reserve is obtained by the following equation (1):

$$HRR=(LHR-RHR)*n/100+RHR \qquad \text{eq. (1)}$$

HRR: heart rate corresponding to n % HR Reserve

LHR: largest heart rate

RHR: resting heart rate where the estimated largest heart rate reserve capacity (HR Reserve) is (largest heart rate–resting heart rate).

Indicated by n[%] is an exercise intensity, which is the ratio relative to an estimated largest heart rate reserve capacity. If the heart rate is equal to the resting heart rate, n is 0[%]. If the heart rate reaches the largest heart rate, n is 100[%]. The exercise intensity n[%] can be inversely obtained by the following equation (2):

$$EI=(HR-RHR)/(LHR-RHR)*100 \qquad \text{eq. (2)}$$

EI: exercise intensity n[%]
HR: heart rate
RHR: resting heart rate
LHR: largest heart rate As for the setting items to be specified prior to the start of exercise, the user selects one from among the above-described free mode and several kinds of assistance modes. In addition to these modes, a mode for reproducing music as an ordinary music player may be also added. The apparatus may be designed such that the user is allowed to switch from the free mode or assistance mode to the mode for ordinary music reproduction by operating a setting operator during the exercise. The apparatus may also be designed such that a previously selected mode is set as default setting. Alternatively, the apparatus may be designed to have a schedule managing capability so that the exercise program mode automatically switches on a daily basis.

In the shown example, an exercise duration is specified. When the stop button is operated, however, the apparatus can stop the reproduction of a music data file, or move to the reproduction for the cooling down stage. Therefore, the exercise duration is not necessarily required as a setting item. When the distance, the amount of calories consumed, the amount of burnt fat or the like reaches a certain amount, the apparatus can also cause automatic termination of the reproduction of music data or automatic transfer to the reproduction in the cooling down stage. In accordance with a set mode of the assistance modes and user's basic settings, the apparatus creates an exercise program (exercise menu) most suitable for each user.

FIG. 8B shows concrete items specified according to exercise program when "jogging mode" which is included in the assistance mode is selected. The jogging mode has exercise stages of warming-up 1, warming-up 2, jogging (main exercise stage), cooling down 1, cooling down 2. In the respective exercise stages, a duration, an initial value [BPM] of music tempo most suitable for individual user, and a target exercise intensity [%] are set. The target exercise intensity [%] may be replaced with a target heart rate [BPM] which is equal to n [%] of an estimated largest heart rate reserve capacity.

As the above-described initial value [BPM] of music tempo and the target exercise intensity [%] most suitable for the user, the apparatus has default values defined on the basis of the basic setting items and the settings items input prior to exercise. However, the apparatus may be designed to allow the user to change the initial values [BPM] of music tempo and the target exercise intensity [%] by operating the pacing-up button or the pacing-down button. In order to cause the changes made by the user's operation to affect the user's later exercise, furthermore, the apparatus may change the default values for the user and then store the new default values. In accordance with previous exercise results, in addition, the apparatus may change the user's default values in consideration of his physical strength age and the like. FIG. 8C shows items displayed after exercise. The run distance is obtained by deriving user's stride from his height and multiplying the derived stride by the total number of steps. The amount of calories consumed is calculated from user's workload. The amount of burnt fat is calculated on the basis of duration during which the exercise intensity stands at 70%.

FIG. 9A is an explanatory diagram showing optimal exercise intensity characteristics (optimal exercise intensity curve) in the jogging mode which is included in the assistance mode. The horizontal axis indicates elapsed time [minute] of exercise, while the vertical axis indicates target exercise intensity n[%]. The target exercise intensity may be replaced with target heart rate (heart rate corresponding to n % HR Reserve). In this case, the optimal exercise intensity characteristics can be referred to as mode-specific optimal heart rate characteristics (mode-specific optimal heart rate curve). FIG. 9B is an explanatory diagram showing set values of music tempo in the same jogging mode. The horizontal axis indicates elapsed time [minute] of exercise, while the vertical axis indicates set values [BPM] of music tempo. These values are determined according to the set values shown in FIG. 8B.

In this embodiment, only in the "jogging" (main exercise stage) stage, the apparatus changes the music tempo in accordance with the comparison between the user's exercise intensity (heart rate) and the range of the target exercise intensity (target heart rate) to help the user with his exercise. In the "warming-up 1" and "warming-up 2" (stages where exercise is started) stages, set music tempo values are directly specified. The target exercise intensity (target heart rate) is a mere guide in the exercise program. The set music tempo value may be one. In the shown example, however, the set music tempo value changes to create two stages according to the elapsed time in the exercise start stage.

In the "jogging" stage (main exercise stage), the set music tempo value is defined as an initial value. The "jogging" stage has a constant user's target exercise intensity (target heart rate), being provided with an allowable range extending from the target exercise intensity n [%]. In the shown example, the allowable range is defined as a range extending from the target exercise intensity n [%] toward positive and negative directions by 5[%], respectively. The allowable range of the target exercise intensity n [%] may be defined on the basis of a ratio to the target exercise intensity n [%]. In addition to the allowable range, the jogging stage is provided with warning ranges. In the shown example, the warning ranges are defined as the ranges placed symmetrically about the target exercise intensity n [%] and spaced apart from the target exercise intensity by 15%, respectively, that is, the ranges exceeding the value of n+15% and falling below the value of n−15%. The warning ranges may be defined on the basis of a ratio to the target exercise intensity n [%].

As far as a user's exercise intensity falls within the allowable range of the target exercise intensity provided for the current elapsed time, the music tempo will not be changed. If the user's exercise intensity falls outside the allowable range of the target exercise intensity and enters either of the warning ranges placed farther away from the allowable range, however, the apparatus changes the music tempo even during reproduction of a song so that the difference between the user's exercise intensity and the target exercise intensity is reduced. The apparatus then selects a music data file having a music tempo value corresponding to the new music tempo and starts the reproduction of the selected music data file.

If the user's exercise intensity falls outside the allowable range of the target exercise intensity but does not enter either of the warning ranges at the completion of the reproduction time of the currently reproduced music data file, the apparatus changes the music tempo so that the difference between the user's exercise intensity and the target exercise intensity is reduced. After the completion of the reproduction time of the currently reproduced music data file, the apparatus selects a music data file having a music tempo value corresponding to the new music tempo, and starts the reproduction of the selected music data file.

In the "cooling down 1" and the "cooling down 2" (stages where exercise is completed) as well, set music tempo values are directly specified as in the case of the "warming-up" stage. The target exercise intensity (target heart rate) is a mere guide for the exercise program. The set music tempo value may be one. In the shown example, however, the set music tempo value changes to create two stages according to the elapsed time in the exercise completion stage.

The music tempo set in the "cooling down 1" stage may be changed in consideration of user's actual walking tempo. By use of the walking tempo sensor used in the free mode, more specifically, a walking tempo sensed prior to the exercise completion stage by the walking tempo sensor is compared with the set music tempo value of the exercise completion stage. In accordance with the comparison result, a value obtained by making a change to the set music tempo value of the exercise completion stage is specified as the music tempo value for the "cooling down 1". More specifically, a value which is smaller by a certain amount than the walking tempo sensed prior to the exercise completion stage is compared with the music tempo value set for the exercise completion stage to define the smaller one derived from the comparison as the music tempo value which will be specified as the "cooling down 1". The above-described certain amount is a certain ratio of the sensed walking tempo, however, the certain amount may be merely a certain value.

At the time of selection of a music data file to be reproduced at the start of the exercise such as the warming-up 1 and warming-up 2, as well as at the completion of the exercise such as the cooling down 1 and cooling down 2, the apparatus can give consideration to song impression. In the warming-up stages, a music data file having a song impression which makes the music tempo perceived as fast (song impression of up-tempo) is to be selected. In the cooling down stages, a music data file having a song impression which makes the music tempo perceived as slow (song impression of down-tempo) is to be selected.

Figure 10:
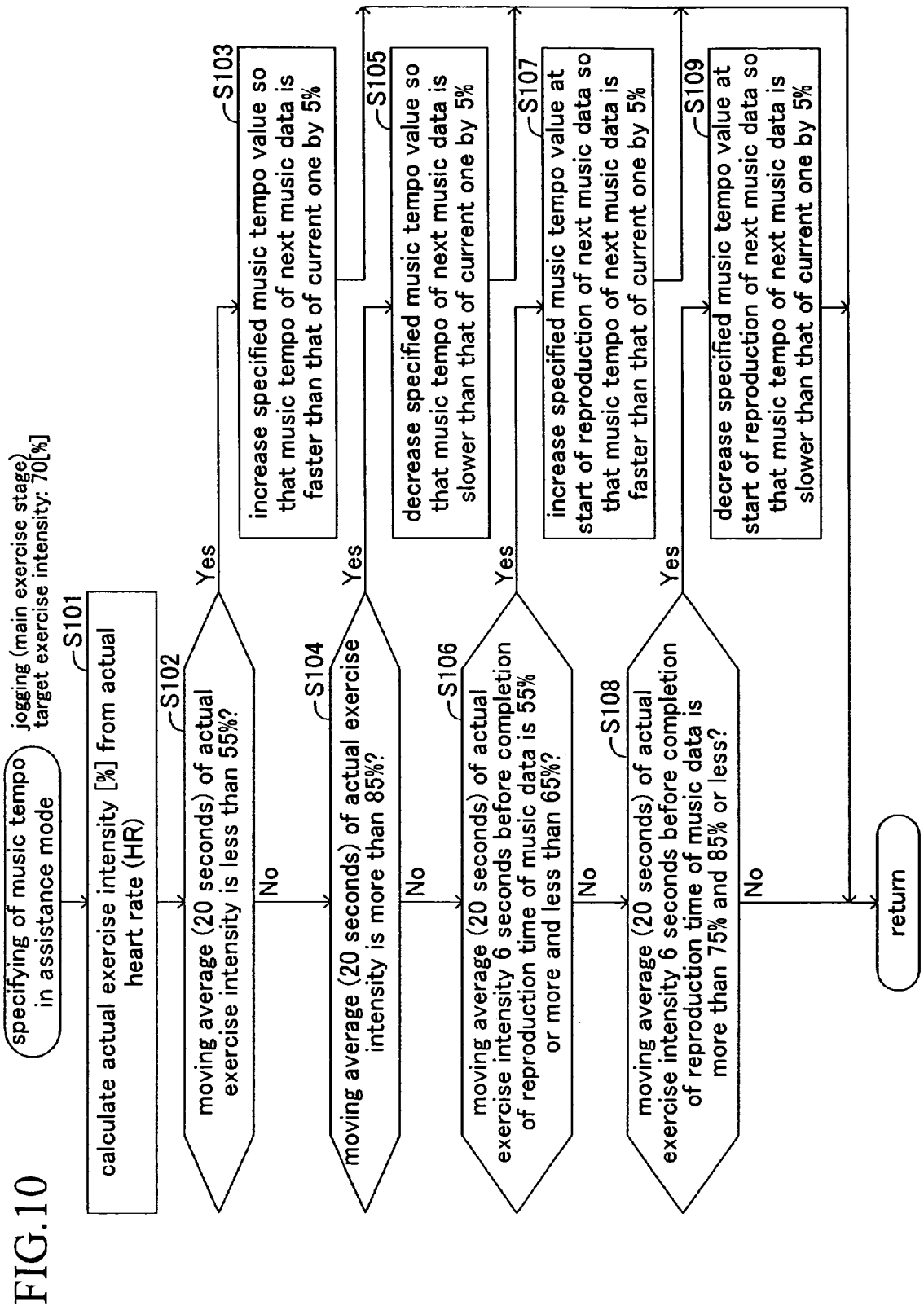
FIG. 10 is a flowchart detailing a process of S69 of FIG. 4C, the process specifying a music tempo in a main exercise period in the assistance mode.

In the case of the assistance mode, there is a close correlation among change of specified music tempo value, selection of music data and timing to switch reproduction of a music data file in the main exercise period during which the apparatus actually assists the user. FIG. 10 is a flowchart showing details of the process for specifying music tempo (S69 of FIG. 4C) in the main exercise period in the assistance mode. In FIG. 9, the process corresponds to the jogging stage (main exercise stage). As already mentioned above, the values shown in the flowchart are mere examples. At S101, an actual exercise intensity [%] is calculated from an actual heart rate (HR) sensed by the heart range sensor 27 on the basis of the equation (2) described above. In the following steps, an actual heart rate and a target heart rate are converted to an exercise intensity for comparison.

If it is determined at S102 that the moving average (20 seconds) of the actual exercise intensity is less than 55 (=70−15)%, the process proceeds to S103 to instantaneously increase the music tempo so that the increased music tempo is faster than the current music tempo by 5%. If it is determined at S104 that the moving average (20 seconds) of the actual exercise intensity is more than 85 (=70+15)%, the process proceeds to S105 to instantaneously decrease the music tempo so that the decreased music tempo is slower than the current music tempo by 5%. If it is determined at S106 that the moving average (20 seconds) of the actual exercise intensity six seconds before the completion of the reproduction time of the music data file is 55 (=70−15)% or more and less than 65 (=70−5)%, the process proceeds to S107 to increase the music tempo of a music data file to be reproduced next so that the music tempo of the next music data is faster than that of the current music data by 5%. If it is determined at S108 that the moving average (20 seconds) of the actual exercise intensity six seconds before the completion of the reproduction time of the music data file is more than 75 (=70+15)% and 85 (=70+15)% or less, the process proceeds to S109 to decrease the music tempo of a music data file to be reproduced next so that the music tempo of the next music data is slower than that of the current music data by 5%.

In the above steps, the moving average is used in order to reduce influence caused by temporal fluctuations of the heart rate. As for the actual heart rate itself obtained at S101, the heart rate is measured by use of moving average, which is considered as insufficient, therefore, moving average is used at the above-described steps as well. In the above steps of S106, S108, the determination is made six seconds before the completion of the reproduction time of a music data file, because the music data file is cross-faded with a stopgap music file for the immediately preceding five seconds from the completion of the reproduction time of the music data file. Furthermore, the determination is moved up by one more second in order to give consideration to delay caused by a process required after the determination step.

Figure 11:
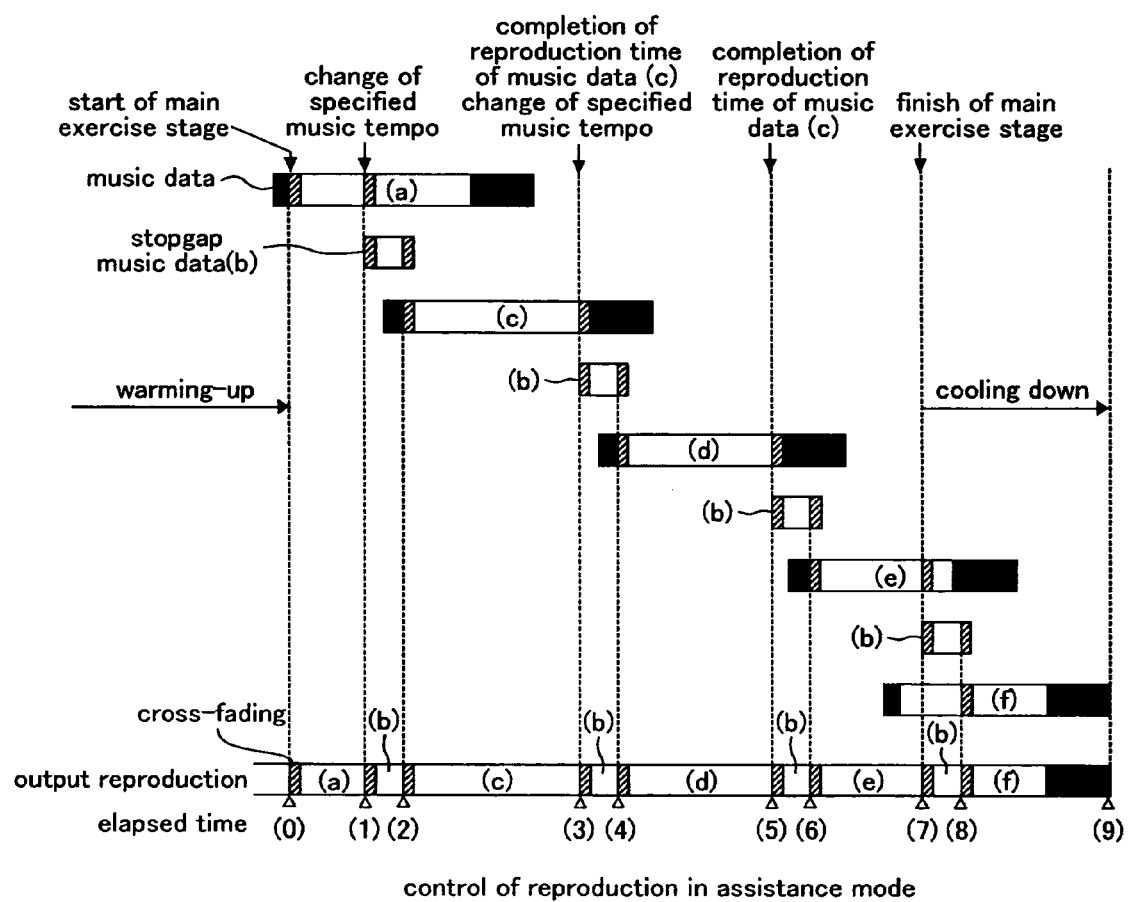
FIG. 11 is an explanatory diagram of a concrete example showing the control of reproduction of music data in the main exercise period in the assistance mode shown in S65 through S67 of FIG. 4C.

FIG. 11 is an explanatory diagram showing the process for controlling the reproduction of music data performed at S65 through S67 shown in FIG. 4C, referring a concrete example. In FIG. 9, the process corresponds to the control of reproduction of music data in jogging stage (main exercise stage). Although the music data files are provided with symbols (a) through (f) in FIG. 11, there is no correlation with the symbols used in FIG. 6. At the start of the main exercise stage, the apparatus selects a music data (a) and starts reproduction of the selected music data (a) from the position subsequent to the end of the introduction portion, however, the music data file (a) is cross-faded with a stopgap music data file (b) which is not shown, the stopgap music data file (b) connecting the music data file (a) with a music data file of the warming-up stage.

At elapsed time (1), the actual exercise intensity (moving average) enters the warning range, resulting in a change made to a music tempo which will be specified. The change of the music tempo then causes the apparatus to select music data (c) having a music tempo value corresponding to the newly specified music tempo. As in the case of the free mode shown in FIG. 6, the apparatus inserts stopgap music data between music data files, cross-fading between the stopgap music data and the music data. As a result, the apparatus starts the reproduction of the music data (c) at elapsed time (2). The stopgap music data (b) is inserted so that the beat timing of the stopgap music data (b) coincides with that of the preceding and subsequent music data files (a) and (c), respectively. In addition, the music tempo of the stopgap music data (b) changes step by step from the music tempo of the music data (a) to that of the music data (c). Consequently, the apparatus is capable of seamlessly switching music data files.

When the apparatus has reproduced the music data (c) until certain reproduction time elapses (in the shown example, before the ending portion), the apparatus completes the reproduction of the music data (c). At some point in time (six seconds earlier) before the position where the reproduction of the music data (c) completes (five seconds after elapsed time (3) in the example of FIG. 11), if the actual exercise intensity (moving average) does not enter the warning ranges but falls outside the allowable range, a music tempo which will be specified is changed. At the retrieval of a music data for the next reproduction, the apparatus searches for a music data file having a music tempo value corresponding to the newly specified music tempo, and selects music data (d). Consequently, the apparatus starts reproduction of the stopgap music data (b) at elapsed time (3), cross-fading with the music data (c) until the position where the reproduction of the music data (c) completes. At elapsed time (4), the apparatus starts reproduction of the music data (d) from the position subsequent to the end of the introduction portion, cross-fading with the stopgap music data (b).

When the apparatus has reproduced the music data (d) until certain reproduction time elapses (before the ending portion), the apparatus completes the reproduction of the music data (d). At some point in time (six seconds earlier) before the position where the reproduction of the music data (d) completes (five seconds after elapsed time (5)), if the actual exercise intensity (moving average) does not fall outside the allowable range, the apparatus does not change the music tempo which will be specified, and searches for a music data file to be reproduced next, and selects music data (e). Consequently, the apparatus starts reproduction of the stopgap music data (b) at elapsed time (5), cross-fading with the music data (d) until the position where the reproduction of the music data (d) completes. At elapsed time (6), the apparatus starts reproduction of the music data (e) from the position subsequent to the end of the introduction portion, cross-fading with the stopgap music data (b).

At elapsed time (7), if it is the time to terminate the main exercise stage, the apparatus moves to the cooling down stage, which is not shown in the flowchart of FIG. 10. In FIG. 1B, a certain music tempo suitable for the user is provided for the use in the cooling down reproduction. The music tempo specifying portion 9 specifies the provided music tempo. The reproduction control portion 10 selects a music data file (f) having a music tempo value corresponding to the specified music tempo and causes the music data reproduction portion 6 to start reproduction of the selected music data file (f) at elapsed time (8). From elapsed time (7) to the cross-fading finish position of elapsed time (8), the stopgap music data (b) is reproduced. In a case where the duration of the cooling down is specified, the start position of the reproduction of the music data file (f) is determined on condition that the music data file (f) including the ending portion is to be reproduced. Then, at the elapsed time (8), the reproduction of the music data file (f) is started.

As described with reference to FIG. 6, in the assistance mode as well, if an instruction to terminate the reproduction of music data is input, the apparatus may reproduce the currently reproduced music data file including the ending portion before terminating the reproduction, or may select a music data file having a music tempo value corresponding to the music tempo provided for cooling down and reproduce the selected music data until the end of the ending portion. FIG. 9A through FIG. 11 may be modified to have only the allowable range without the warning ranges. In this modification, a change to a specified music tempo is made at a point in time when the exercise intensity falls outside the allowable range or at a point in time when the reproduction time of the currently reproduced music data completes (however, if the exercise intensity is still beyond the allowable range).

Figure 12:
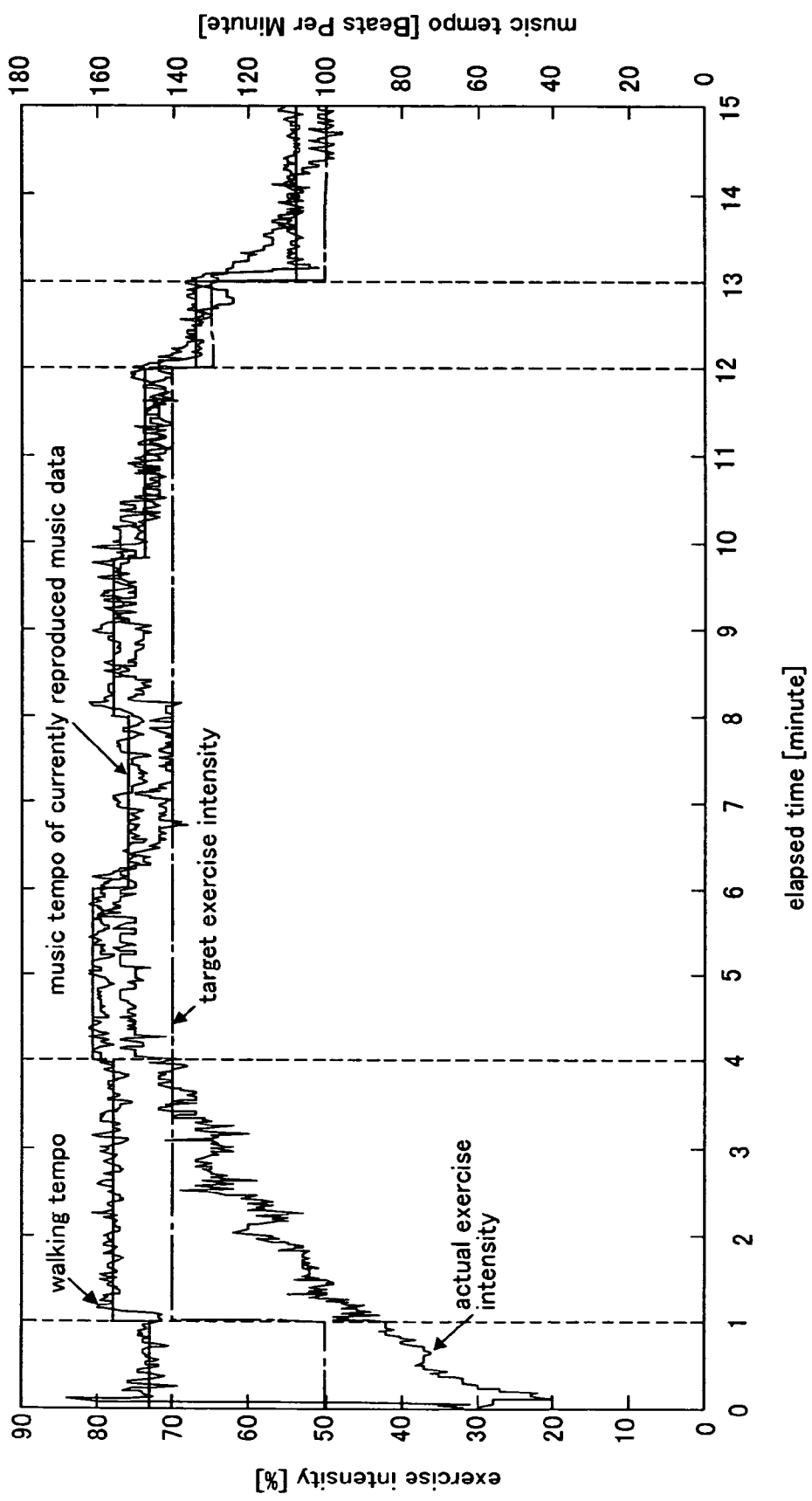
FIG. 12 is a graph showing a concrete example in which the reproduction of music data is controlled by use of the optimal exercise intensity characteristics and the set values of music tempo in the jogging mode shown in FIG. 9.

FIG. 12 is a graph showing a concrete example in which the reproduction of music data is controlled by use of the optimal exercise intensity characteristics (optimal exercise intensity curve) and the set values of the music tempo in the jogging mode shown in FIGS. 9A, 9B. In FIG. 12, the horizontal axis indicates elapsed time [minute] of exercise. The vertical axis (left) indicates actual exercise intensity [%] and target exercise intensity [%], while the vertical axis (right) indicates music tempo [BPM]. In FIG. 12, the time length for obtaining moving average is 4 [seconds] although it is 20 [seconds] in FIG. 10. The longest reproduction time of a music data file is limited to 2 [minutes] 5 [seconds] (time for cross-fading (e.g., 5 [seconds] is added). The stopgap music data (b) is not inserted.

In the "warming-up 1" stage, since a music data file having a music tempo of 146 [BPM] which is the closest to a set value of 145 [BPM] is stored, the apparatus selects this music data file and starts the reproduction of the music data file. When 1 [minute] has passed since the start of the exercise, the apparatus enters the "warming-up 2" stage. Since a music data file having a music tempo of 156 [BPM] which is the closest to a set value of 155 [BPM] is stored, the apparatus selects this music data file and switches the reproduction of music from the previous music data file to this music data file, cross-fading the two music data files for 5 seconds. When 3 [minutes] have passed since the start of the exercise to reach a point in time which is 5 seconds in advance of the completion of the reproduction time (2 minutes 5 seconds) of the music data file, since another music data file having a music tempo of 156 [BPM] which is the same music tempo value of the current music data file is stored, the apparatus selects the another music data file and switches the reproduction of music from the current music data to the another music data, cross-fading the two music data for 5 seconds. When 4 [minutes] have passed since the start of the exercise, the apparatus enters the "jogging" stage. Since a music data file having a music tempo of 161 [BPM] which is the closest to a set value of 160 [BPM] is stored, the apparatus selects this music data file and switches the reproduction of music from the another music data to this music data, cross-fading the two music data files for 5 seconds.

On the basis of comparison between an actual exercise intensity [%] and the certain range defined as a range extending from the target exercise intensity of 70 [%] toward positive and negative directions by 5[%], respectively, a specified music tempo is changed 6 seconds in advance of the completion of the reproduction time. The apparatus then selects a music data file having a music tempo value closest to the newly specified music tempo, and successively switches the reproduction of music data files 5 seconds in advance of the completion of the reproduction time, cross-fading two music data files. In this concrete example, since the actual exercise intensity [%] does not enter the warning ranges placed symmetrically about the target exercise intensity [%] and spaced apart from the target exercise intensity by 15%, respectively, a change which is made to a music tempo at some point in time which is even earlier than 6 seconds in advance of the completion of reproduction time of currently reproduced music data does not occur.

When 12 [minutes] have passed since the start of the exercise, the apparatus enters the "cooling down 1" stage. The music tempo value set for this stage is 150 [BPM]. At 11 [minutes] 59 [seconds] which is 1 [second] in advance of the entering the "cooling down 1" stage, however, the actual walking tempo is 148 [BPM], resulting in a small difference between the set music tempo value and the actual walking tempo. Because such a small difference produces little cooling-down effect, this concrete example compares the value (137 [BPM]) obtained by subtracting 7 [%] from the actual walking pitch measured at the end of the main exercise stage with the initial value (150 [BPM]) of the "cooling down 1" stage, and employs the smaller one (137 [BPM]) as the value which is specified as the music tempo value for the "cooling down 1". Since a music data file having a music tempo value of 134 [BPM] which falls within a range extending from the specified music tempo of 137 [BPM] toward positive and negative directions by 3 [%] of the specified music tempo and is the closest to the specified music tempo is stored, the apparatus selects this music data file, and switches the reproduction of music data to the selected music data file when 12 [minutes] has passed, cross-fading the two music data files.

When 13 [minutes] have passed, the apparatus enters the "cooling down 2" stage. The music tempo value set for the stage is 110 [BPM]. Since a music data file having a music tempo value of 108 [BPM] which falls within a range extending from the specified music tempo of 110 [BPM] toward positive and negative directions by 3 [%] of the specified music tempo value and is the closest to the specified music tempo is stored, the apparatus selects this music data file, and switches the reproduction of music data to the selected music data file, cross-fading the two music data files. When 15 [minutes] have passed, the exercise time expires, resulting in the termination of the reproduction of music data. In accordance with the range defined on the basis of a target exercise intensity (target heart rate) of the respective stages, in the warming-up and cooling down stages as well, the apparatus may change a specified music tempo value, and switch music data to help the user with his exercise. The target exercise intensity (target heart rate) may not be a constant value in the respective stages including the main exercise stage but may be a function of time which varies with the passage of time.

The above explanation uses various parameters whose values are previously set such as the time length for obtaining moving average and the certain range used at the comparison of values. These parameter values affect response properties and sensitivity. Therefore, these parameter values may be either fixed or freely specified in accordance with the walking tempo value, music tempo value, user's operation to set conditions, and the like. In addition, the apparatus may automatically customize the parameter values for each user on the basis of the history of use.

The above explanation is made for a case where the user jogs or runs while listening to the music. However, the present invention can be also applied to cases where the user performs repetitive exercise including exercise by use of a training machine such as bicycle-style ergometer, treadmill, and strength machine, as well as gymnastic exercise and dance, while listening to the music. In these cases, an acceleration sensor is attached to an appropriate body part of the user in accordance with the type of the repetitive exercise, while the acceleration characteristics defined as one step of the repetition is determined. Then, an algorithm for detecting the step is designed. In these cases, instead of walking pitch, a repetitive tempo (the number of repetition per unit time) determined on the basis of the time required for one repetitive step according to the respective repetitive exercise is detected in the free mode. In the assistance mode, an initial value of the repetitive tempo is set instead of the initial value of the walking pitch. The target exercise intensity (target heart rate) is set in a manner similar to the above explanation.

The above explanation does not include description about the contents of the music data files. The contents of the music data are not limited to performance by a musical instrument but may be anything such as only vocal, or vocal with accompaniment as far as the user can grasp beats. If necessary, musical genres may be provided so that the selection of a music data file having an appropriate music tempo is done within a specified musical genre. The above explanation is provided on the premise that a plurality of music data files are reproduced at their respective music tempos. However, the art for specifying a music tempo according to the walking tempo or heart rate, the art for phase-locking between the first beat timing and a walking tempo, the art for controlling the reproduction of music data at the termination of exercise, and the art for providing a warming-up stage and a cooling down stage can be also applied to cases where conventional arts such as changing the tempo of electronic sounds or changing the music tempo of certain music data and reproducing the music data are used.

What is claimed is:

1. An apparatus for controlling music reproduction, the apparatus comprising:
    a repetitive tempo sensing portion for sensing a repetitive tempo during user's repetitive exercise;
    a music tempo specifying portion for specifying a music tempo value corresponding to the repetitive tempo sensed by the repetitive tempo sensing portion;
    a data storing portion for storing a plurality of music data files recorded in waveform data type and at least one music data file recorded in performance data type; and
    a reproduction controlling portion for selecting a music data file of waveform data type having a music tempo value falling within a certain range extending from the specified music tempo value from among the plurality of music data files of waveform data type stored in the data storing means if the data storing means stores any one of music data files of waveform data type having the music tempo value falling within the certain range extending from the specific music tempo value, and causing start of reproduction of the selected music data file, and for selecting the at least one music data file of performance data type if the data storing means does not store any music data file of waveform data type having a music tempo value falling within the certain range extending from the specified music tempo value, and causing start of reproduction of the selected music data file of performance data type at the specified music tempo value.

2. An apparatus for controlling music reproduction according to claim 1, the apparatus further comprising:
    a repetitive timing sensing portion for sensing repetitive timing of repetitive exercise during user's repetitive exercise, wherein
    the reproduction controlling portion causes start of reproduction of the selected music data file such that an initial beat timing of reproduction section of the music data file synchronizes to the repetitive timing sensed by the repetitive timing sensing portion.

3. An apparatus for controlling music reproduction according to claim 1, wherein
    when a repetitive tempo value sensed by the repetitive tempo sensing portion rapidly decreases, the reproduction controlling portion temporarily stops the reproduction of the music data file until recovery of the repetitive tempo value.

4. An apparatus for controlling music reproduction according to claim 1, the apparatus further comprising:
    a setting portion for setting a music tempo for an exercise completion stage of the repetitive exercise, wherein
    the data storing portion stores, along with the plurality of music data files, song impression data representative of perceived degree of speed of music tempo of the respective music data files;
    the music tempo specifying portion specifies, at the exercise completion stage, the music tempo value for the exercise completion stage set by the setting portion; and
    at the exercise completion stage, the reproduction controlling portion searches song impression data of the plurality of music data files stored in the data storing portion, and selects a music data file having a music tempo value corresponding to the music tempo specified by the music tempo specifying portion from among one or a plurality of music data files having a song impression which makes music tempo perceived as slow.

5. An apparatus for reproducing music, the apparatus comprising, in addition to an apparatus for controlling music reproduction according to claim 1:
   the data storing portion;
   a music data retrieving portion for storing a music data file selected in accordance with users operation along with data on music tempo of the music data file in the data storing portion; and
   a music data reproducing portion for reproducing a music data file selected by the apparatus for controlling music reproduction.

6. A computer-readable storage medium comprising program code for controlling music reproduction, the program code causing a computer to execute:
   a repetitive tempo sensing step of sensing a repetitive tempo during user's repetitive exercise;
   a music tempo specifying step of specifying a music tempo value corresponding to the repetitive tempo sensed by the repetitive tempo sensing step;
   a data storing step for storing a plurality of music data files recorded in waveform data type and at least one music data file recorded in performance data type; and
   a reproduction controlling step of selecting a music data file of waveform data type having a music tempo value falling within a certain range extending from the specified music tempo value from among the plurality of music data files of waveform data type stored in the data storing means if the data storing means stores any one of music data files of waveform data type having the music tempo value falling within the certain range extending from the specific music tempo value, and causing start of reproduction of the selected music data file, and for selecting the at least one music data file of performance data type if the data storing means does not store any music data file of waveform data type having a music tempo value falling within the certain range extending from the specified music tempo value, and causing start of reproduction of the selected music data file of performance data type at the specified music tempo value.

7. An apparatus for controlling music reproduction, the apparatus comprising:
   a heart rate sensing portion for sensing heart rate during user's repetitive exercise;
   a setting portion for setting a music tempo and a target heart rate;
   a music tempo specifying portion for defining the music tempo set by the setting portion as an initial value, and specifying a value of the music tempo such that a difference between the heart rate sensed by the heart rate sensing portion and the target heart rate set by the setting portion is reduced;
   a data storing portion for storing a plurality of music data files recorded in waveform data type and at least one music data file recorded in performance data type; and
   a reproduction controlling portion for selecting a music data file of waveform data type having a music tempo value falling within a certain range extending from the specified music tempo value from among the plurality of music data files of waveform data type stored in the data storing means if the data storing means stores any one of music data files of waveform data type having the music tempo value falling within the certain range extending from the specific music tempo value, and causing start of reproduction of the selected music data file, and for selecting the at least one music data file of performance data type if the data storing means does not store any music data file of waveform data type having a music tempo value falling within the certain range extending from the specified music tempo value, and causing start of reproduction of the selected music data file of performance data type at the specified music tempo value.

8. An apparatus for controlling music reproduction according to claim 7, the apparatus further comprising:
   a repetitive timing sensing portion for sensing repetitive timing of repetitive exercise during user's repetitive exercise, wherein
   the reproduction controlling portion causes start of reproduction of the selected music data file such that an initial beat timing of reproduction section of the music data file synchronizes to the repetitive timing sensed by the repetitive timing sensing portion.

9. An apparatus for controlling music reproduction according to claim 7, the apparatus further comprising:
   a beat sound generation specifying portion for specifying whether to generate beat sounds or not; and
   a beat sound generation controlling portion for generating the beat sounds at a music tempo value of a music data file being currently reproduced if the beat sound generation specifying portion has determined that the beat sounds are to be generated.

10. An apparatus for controlling music reproduction according to claim 7, the apparatus further comprising:
    a repetitive tempo sensing portion for sensing a repetitive tempo during user's repetitive exercise; and
    a beat sound generation controlling portion for generating the beat sounds at a music tempo value of a music data file being currently reproduced if a repetitive tempo sensed by the repetitive tempo sensing portion falls outside a certain range extending from a music tempo specified by the music tempo specifying portion.

11. An apparatus for controlling music reproduction according to claim 7, the apparatus further comprising:
    a setting portion for setting a music tempo for an exercise start stage of the repetitive exercise and a music tempo for an exercise completion stage of the repetitive exercise, wherein
    the data storing portion stores, along with the plurality of music data files, song impression data representative of perceived degree of speed of music tempo of the respective music data files;
    the music tempo specifying portion specifies, at the exercise start stage, the music tempo value for the exercise start stage set by the setting portion; and
    at the exercise completion stage, the music tempo specifying portion specifies the music tempo value for the exercise completion stage set by the setting portion; and
    at the exercise start stage, the reproduction controlling portion searches song impression data of the plurality of music data files stored in the data storing portion, and selects a music data file having a music tempo value corresponding to the music tempo specified by the music tempo specifying portion from among one or a plurality of music data files having a song impression which makes music tempo perceived as fast; and
    at the exercise completion stage, the reproduction controlling portion searches song impression data of the plurality of music data files stored in the data storing portion, and selects a music data file having a music tempo value corresponding to the music tempo specified by the music tempo specifying portion from among one or a plurality of music data files having a song impression which makes music tempo perceived as slow.

12. An apparatus for reproducing music, the apparatus comprising, in addition to an apparatus for controlling music reproduction according to claim 7:
   the data storing portion;
   a music data retrieving portion for storing a music data file selected in accordance with user's operation along with data on music tempo of the music data file in the data storing portion; and
   a music data reproducing portion for reproducing a music data file selected by the apparatus for controlling music reproduction.

13. A computer-readable storage medium comprising program code for controlling music reproduction, the program code causing a computer to execute:
   a heart rate sensing step of sensing heart rate during user's repetitive exercise;
   a setting step of setting a music tempo and a target heart rate;
   a music tempo specifying step of defining the music tempo set by the setting portion as an initial value, and specifying a value of the music tempo such that a difference between the heart rate sensed by the heart rate sensing step and the target heart rate set by the setting step is reduced;
   a data storing step for storing a plurality of music data files recorded in waveform data type and at least one music data file recorded in performance data type; and
   a reproduction controlling step of selecting a music data file of waveform data type having a music tempo value falling within a certain range extending from the specified music tempo value from among the plurality of music data files of waveform data type stored in the data storing means if the data storing means stores any one of music data files of waveform data type having the music tempo value falling within the certain range extending from the specific music tempo value, and causing start of reproduction of the selected music data file, and for selecting the at least one music data file of performance data type if the data storing means does not store any music data file of waveform data type having a music tempo value falling within the certain range extending from the specified music tempo value, and causing start of reproduction of the selected music data file of performance data type at the specified music tempo value.

14. An apparatus for controlling music reproduction, the apparatus comprising:
   a mode setting portion for setting music reproduction controlling function at free mode or assistance mode in accordance with user's selecting operation;
   a repetitive tempo sensing portion for sensing a repetitive tempo during user's repetitive exercise at least when the music reproduction controlling function is set at the free mode;
   a heart rate sensing portion for sensing heart rate during user's repetitive exercise at least when the music reproduction controlling function is set at the assistance mode;
   a setting portion for setting a music tempo and a target heart rate when the music reproduction controlling function is set at the assistance mode;
   a music tempo specifying portion for specifying a music tempo value corresponding to a repetitive tempo sensed by the repetitive tempo sensing portion when the music reproduction controlling function is set at the free mode; while when the music reproduction controlling function is set at the assistance mode, defining the music tempo set by the setting portion as an initial value, and specifying a value of the music tempo such that a difference between the heart rate sensed by the heart rate sensing portion and the target heart rate set by the setting portion is reduced;
   a data storing portion for storing a plurality of music data files recorded in waveform data type and at least one music data file recorded in performance data type; and
   a reproduction controlling portion for selecting a music data file of waveform data type having a music tempo value falling within a certain range extending from the specified music tempo value from among the plurality of music data files of waveform data type stored in the data storing means if the data storing means stores any one of music data files of waveform data type having the music tempo value falling within the certain range extending from the specific music tempo value, and causing start of reproduction of the selected music data file, and for selecting the at least one music data file of performance data type if the data storing means does not store any music data file of waveform data type having a music tempo value falling within the certain range extending from the specified music tempo value, and causing start of reproduction of the selected music data file of performance data type at the specified music tempo value.

15. An apparatus for reproducing music, the apparatus comprising, in addition to an apparatus for controlling music reproduction according to claim 14:
   the data storing portion;
   a music data retrieving portion for storing a music data file selected in accordance with user's operation along with data on music tempo of the music data file in the data storing portion; and
   a music data reproducing portion for reproducing a music data file selected by the apparatus for controlling music reproduction.

16. A computer-readable storage medium comprising program code for controlling music reproduction, the program code causing a computer to execute:
   mode setting step of setting music reproduction controlling function at free mode or assistance mode in accordance with user's selecting operation;
   repetitive tempo sensing step of sensing a repetitive tempo during user's repetitive exercise at least when the music reproduction controlling function is set at the free mode;
   heart rate sensing step of sensing heart rate during user's repetitive exercise at least when the music reproduction controlling function is set at the assistance mode;
   setting step of setting a music tempo and a target heart rate when the music reproduction controlling function is set at the assistance mode;
   music tempo specifying step of specifying a music tempo value corresponding to a repetitive tempo sensed by the repetitive tempo sensing step when the music reproduction controlling function is set at the free mode; while when the music reproduction controlling function is set at the assistance mode, defining the music tempo set by the setting step as an initial value, and specifying a value of the music tempo such that a difference between the heart rate sensed by the heart rate sensing step and the target heart rate set by the setting step is reduced;
   a data storing step for storing a plurality of music data files recorded in waveform data type and at least one music data file recorded in performance data type; and
   reproduction controlling step of selecting a music data file of waveform data type having a music tempo value falling within a certain range extending from the specified music tempo value from among the plurality of music data files of waveform data type stored in the data storing means if the data storing means stores any one of music data files of waveform data type having the music tempo value falling within the certain range extending from the specific music tempo value, and causing start of reproduction of the selected music data file, and for selecting the at least one music data file of performance data type if the data storing means does not store any music data file of waveform data type having a music tempo value falling within the certain range extending from the specified music tempo value, and causing start of reproduction of the selected music data file of performance data type at the specified music tempo value.

* * * * *